United States Patent
Kotra et al.

(10) Patent No.: US 11,259,054 B2
(45) Date of Patent: Feb. 22, 2022

(54) IN-LOOP DEBLOCKING FILTER APPARATUS AND METHOD FOR VIDEO CODING

(71) Applicant: HUAWEI TECHNOLOGIES CO., LTD., Shenzhen (CN)

(72) Inventors: Anand Meher Kotra, Munich (DE); Biao Wang, Munich (DE); Zhijie Zhao, Munich (DE); Semih Esenlik, Munich (DE); Han Gao, Munich (DE); Jianle Chen, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/134,442

(22) Filed: Dec. 27, 2020

(65) Prior Publication Data
US 2021/0127139 A1    Apr. 29, 2021

Related U.S. Application Data

(63) Continuation of application No. PCT/CN2019/093397, filed on Jun. 27, 2019.
(Continued)

(51) Int. Cl.
*H04N 11/02* (2006.01)
*H04N 19/82* (2014.01)
(Continued)

(52) U.S. Cl.
CPC ........... *H04N 19/82* (2014.11); *H04N 19/117* (2014.11); *H04N 19/124* (2014.11); *H04N 19/14* (2014.11); *H04N 19/176* (2014.11); *H04N 19/86* (2014.11)

(58) Field of Classification Search
CPC .... H04N 19/82; H04N 19/117; H04N 19/124; H04N 19/14; H04N 19/176; H04N 19/86
(Continued)

(56) References Cited

U.S. PATENT DOCUMENTS

| | | | | |
|---|---|---|---|---|
| 2006/0029135 A1* | 2/2006 | Zhou | .................... | H04N 19/423 375/240.12 |
| 2006/0078052 A1* | 4/2006 | Dang | ................... | H04N 19/436 375/240.24 |

(Continued)

FOREIGN PATENT DOCUMENTS

| | | |
|---|---|---|
| CN | 102685480 A | 9/2012 |
| CN | 103765889 A | 4/2014 |

(Continued)

OTHER PUBLICATIONS

Sri Nitchith Akula et al., Description of SDR, HDR and 360 video coding technology proposal considering mobile application scenario by Samsung, Huawei, GoPro, and HiSilicon. buJoint Video Exploration Team (JVET) of ITU-T SG 16 WP 3 and ISO/IEC JTC 1/SC 29/WG 11, 10th Meeting: San Diego, US, 10 Apr. 20, 2018, JVET-J0024_v2, 146 pages.
(Continued)

*Primary Examiner* — Jayanti K Patel
*Assistant Examiner* — Richard B Carter

(57) ABSTRACT

An in-loop deblocking filter apparatus (120) for processing a current row or column of samples into a filtered row or column of samples. The current row or column of samples comprises a plurality of samples from a first sample block and a horizontally or vertically neighboring second sample block of a reconstructed picture of a video stream. The samples of the current row or column of samples have sample values $p_{N-1}$-$p_0$, $q_0$-$q_{N-1}$ wherein N is an even integer greater than 2. If a first condition or a second condition is satisfied, the current row or column is processed
(Continued)

by: determining a filtered sample value $q_0'$ by applying a (2N−1)-tap filter to the sample values $p_{N−2}, \ldots, p_0, q_0, \ldots, q_{N−1}$ of the current row or column; and/or determining a filtered sample value $p_0'$ by applying a (2N−1)-tap filter to the sample values $p_{N−1}, \ldots, p_0, q_0, \ldots, q_{N−2}$ of the current row or column.

22 Claims, 9 Drawing Sheets

Related U.S. Application Data

(60) Provisional application No. 62/692,851, filed on Jul. 1, 2018, provisional application No. 62/691,590, filed on Jun. 28, 2018.

(51) Int. Cl.
*H04N 19/117* (2014.01)
*H04N 19/124* (2014.01)
*H04N 19/14* (2014.01)
*H04N 19/176* (2014.01)
*H04N 19/86* (2014.01)

(58) Field of Classification Search
USPC ............. 375/240.03, 240.12, 240.24, 240.29
See application file for complete search history.

(56) References Cited

U.S. PATENT DOCUMENTS

| | | | |
|---|---|---|---|
| 2006/0104349 A1 | 5/2006 | Joch et al. | |
| 2007/0077176 A1 | 4/2007 | Lambert et al. | |
| 2008/0084932 A1* | 4/2008 | Wang | H04N 19/70 |
| | | | 375/240.24 |
| 2012/0213297 A1* | 8/2012 | Lieske | H04N 19/86 |
| | | | 375/240.29 |
| 2013/0034169 A1* | 2/2013 | Sadafale | H04N 19/117 |
| | | | 375/240.24 |
| 2014/0169483 A1 | 6/2014 | Kumar et al. | |
| 2015/0208096 A1* | 7/2015 | Norkin | H04N 19/182 |
| | | | 375/240.29 |

FOREIGN PATENT DOCUMENTS

| | | |
|---|---|---|
| CN | 106134201 A | 11/2016 |
| WO | 2014007736 A1 | 1/2014 |

OTHER PUBLICATIONS

Weijia Zhu et al., Sharp Corporation, Deblocking Improvements for Large CUs, JVET-I0077, Joint Video Experts Team (JVET) of ITU-T SG 16 WP 3 and ISO/IEC ITC I/SC 29/WG 11, 10th Meeting: San Diego, US, Apr. 10-20, 2018, 8 pages.
Andrey Norkin, Ericsson, AHG6: Reduction of block artifacts in HEVC for large blocks, JCTVC-J0286 r3, Joint Collaborative Team on Video Coding (JCT-VC) of ITU-T SG 16 WP 3 and ISO/IECJTC 1/SC29/WG 11, 10th Meeting Stockholm, SE, Jul. 11-20, 2012, 18 pages.
Extended European Search Report issued in EP Application No. 19825054.0, dated Mar. 30, 2021, total 9 pages.
Office Action issued in CN201980043455.2, dated Jun. 8, 2021, total 6 pages.
Yen-Lin Lee et al, Anaylsis and Integrated Architecture Design for Overlap Smooth and in-Loop Deblocking Filter in VC-1, 2007 IEEE International Conference on Image Processing, Date of Conference: Sep. 16-Oct. 19, 2007, total 4 pages.
Rao ziren, Optimization of Loop-filtering Algorithms on HEVC Video Coding Standard, A thesis submitted to Xidian University in partial fulfillment of the requirements for the degree of Master graduation, Dec. 2014, with an English Abstract, total 44 pages.
Notice of Allowance issued in CN201980043455.2, dated Nov. 25, 2021, 4 pages.

* cited by examiner

Fig. 6

IN-LOOP DEBLOCKING FILTER APPARATUS AND METHOD FOR VIDEO CODING

CROSS-REFERENCE TO RELATED APPLICATIONS

This application is a continuation of International Application No. PCT/CN2019/093397, filed on Jun. 27, 2019, which claims priority to U.S. Provisional Application No. 62/691,590, filed on Jun. 28, 2018 and U.S. Provisional Application No. 62/692,851, filed on Jul. 1, 2018. The disclosures of the aforementioned applications are hereby incorporated by reference in their entireties.

TECHNICAL FIELD

Generally, the present invention relates to the field of picture processing, in particular video picture coding. More specifically, the invention relates to an in-loop deblocking filter apparatus and method for filtering reconstructed video pictures and to an encoding apparatus and a decoding apparatus comprising such an in-loop deblocking filter apparatus.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g., scalability and/or three-dimensional (3D) extensions, of these standards.

Basically, according to the block-based hybrid video coding approach a picture is first partitioned into a plurality of sample blocks and then each block is predicted by using intra-picture or inter-picture prediction. These blocks are coded relatively independently from the neighboring blocks and approximate the original signal with some degree of similarity. Since coded blocks only approximate the original signal, the difference between the approximations may cause discontinuities at the prediction and transform block boundaries. These discontinuities can be attenuated by an in-loop deblocking filter.

HEVC defines an in-loop deblocking filter having two filters or filtering modes, namely a normal deblocking filter and a strong deblocking filter. The normal deblocking filter modifies at most two samples on both sides of an edge between two vertically or horizontally neighboring blocks. For using the strong deblocking filter three additional conditions must be satisfied by the samples along the edge relative to some pre-defined threshold. If all of those conditions are satisfied, then the strong deblocking filter is applied. The strong deblocking filter has a more pronounced smoothing effect than the normal deblocking filter for samples along the edge and can modify at most three samples on both sides of an edge between two neighboring sample blocks.

The next generation video codec standard referred to as Versatile Video Coding (VVC) is being studied by ITU-T VCEG (Q6/16) and ISO/IEC MPEG (JTC 1/SC 29/WG 11). One of the main goals of this new video codec standard is to provide a compression capability that significantly exceeds that of the current HEVC standard (including its current extensions and near-term extensions for screen content coding and high-dynamic-range coding). To this end a joint collaboration effort known as the Joint Video Exploration Team (JVET) is evaluating different potential compression technology designs. The VVC Test Model (VTM) describes the features that are under coordinated test model study by the JVET as potential enhanced video coding technology beyond the current capabilities of HEVC.

The VTM uses a new partitioning block structure scheme referred to as Quadtree plus binary tree (QTBT). The QTBT structure removes the concepts of multiple partition types i.e. removes the separation of coding units (CU), prediction units (PU) and transform units (TU), i.e. CU=PU=TU. A QTBT supports more flexible CU partition shapes wherein a CU can have either square or rectangular shape. The minimum width and height of a CU can be 4 samples and the sizes of the CU can also be 4×N or N×4 where N can take values in the range [4, 8, 16, 32]. Furthermore, the largest size of a coding tree unit (CTU) has been increased to 128×128 pixels, which is 4 times larger than the CTU size in HEVC.

Especially for rectangular CUs distortions close to the shorter edge can occur, which result in block artifacts even when the HEVC strong filter is applied. These block artifacts can also be observed along the edge of large CUs, where distortions can be significant due to larger prediction and transform operations.

To address this problem of the conventional HEVC deblocking filter it has been proposed by the JVET in the document JVET-J0024 to apply a stronger deblocking filter for large CUs, if the following conditions are satisfied: (i) for vertical edges the widths of the neighboring sample blocks is larger than 8 samples or for horizontal edges the heights of the neighboring sample blocks is larger than 8 samples; and (ii) for the samples on each side of the edge the following relation holds:

$$(|p_7 - p_0| + |q_7 - q_0|) < \frac{\beta}{8}, \quad (1)$$

wherein $p_0$ denotes the sample value of the first sample and $p_7$ denotes the sample value of the eighth sample to the left/top of the vertical/horizontal edge, wherein $q_0$ denotes the sample value of the first sample and $q_7$ denotes the sample value of the eighth sample to the right/bottom of the vertical/horizontal edge and $\beta$ denotes a threshold value which depends on the quantization parameter (QP). It is worth noting that the filtering operation applies for a vertical/horizontal edge consists of four rows/columns of samples. Only if the first and the fourth rows/columns of samples both satisfy the condition defined by equation (1), the stronger filter is applied.

FIG. 4 shows an example for a discontinuity of the sample values at an edge or boundary between two neighboring sample blocks. For sake of clarity only the first four samples to each side of the edge are shown. Ideally, a deblocking filter shall be applied to smooth such a discontinuity as shown in FIG. 4. However, due to the fact that to both sides of the edge the sample values are continuously decreasing or increasing away from the edge, the strong deblocking filter proposed in JVET-J0024 will not be applied, because the difference between the sample values of the first sample and the eighth sample to both sides of the edge is large so that the condition defined in equation (1) is not satisfied. Consequently, the discontinuity of the sample values illustrated in FIG. 4 will not be smoothed by the strong deblocking filter proposed in JVET-J0024 and, therefore, will lead to block artifacts in the final picture.

Thus, there is a need for an improved in-loop deblocking filter apparatus and method providing a more efficient removal of block artifacts.

SUMMARY

Embodiments of the invention are defined by the features of the independent claims, and further advantageous implementations of the embodiments by the features of the dependent claims.

According to a first aspect the invention relates to an in-loop deblocking filter apparatus for processing a current row or column of samples into a filtered row or column of samples, wherein the current row or column of samples comprises a plurality of samples from a first sample block and a horizontally or vertically neighboring second sample block of a reconstructed picture of a video stream and wherein each sample of the current row or column of samples has a sample value $p_{N-1}$–$p_0$, $q_0$–$q_{N-1}$ with N being an even integer larger than 2. The filter apparatus comprises processing circuitry configured to:

determine (i) whether a first condition defined by the following equation is satisfied:

$$((|p_{N-1} - 2 \cdot p_{N/2} + p_1| + |q_{N-1} - 2 \cdot q_{N/2} + q_1|) \ll 1) < \frac{\beta}{k}$$

wherein β denotes a positive threshold parameter, k is a positive integer and the symbol "<<" denotes the left shift operation and where k is a positive integer, or (ii) whether a second condition defined by the following equation is satisfied:

$$\left(\left(\sum_{i=1}^{N-2} |SDpi + SDqi|\right) \ll 1\right) < (N-2) \cdot \frac{\beta}{k}$$

wherein $SDp_i = |p_{i-1} - 2 \cdot p_i + p_{i+1}|$, $SDq_i = |q_{i-1} - 2 \cdot q_i + q_{i+1}|$ for $i \in [1, 2, \ldots, N-2]$ and β denotes a threshold parameter and k is a positive integer; and if the first condition or the second condition is satisfied and also as a pre-requisite all the other HEVC strong filter conditions are satisfied (as shown in FIG. 9), then, process the current row or column of samples into the filtered row or column of samples by determining a filtered sample value $q_0'$ of the first sample of the current row or column of samples to the right or bottom of a vertical or horizontal edge between the first and the second sample block by applying a (2N–1) tap filter having 2N–1 filter coefficients to the sample values of the current row or column of samples, wherein the filter coefficient for the sample value $q_0$ of the first sample of the current row or column of samples to the right or bottom of the vertical or horizontal edge is equal to 2, wherein the filter coefficient for the sample value $p_{N-1}$ of the farthest sample of the current row or column of samples to the left or top of the vertical or horizontal edge is equal to 0, and the filter coefficients for the other sample values are equal to 1; and/or by determining a filtered sample value $p_0'$ of the first sample of the current row or column of samples to the left or top of a vertical or horizontal edge between the first and the second sample block by applying a (2N–1) tap filter having 2N–1 filter coefficients to the sample values of the current row or column of samples, wherein the filter coefficient for the sample value $p_0$ of the first sample of the current row or column of samples to the left or top of the vertical or horizontal edge is equal to 2, wherein the filter coefficient for the sample value $q_{N-1}$ of the farthest sample of the current row or column of samples to the right or bottom of the vertical or horizontal edge is equal to 0, and the filter coefficients for the other sample values are equal to 1.

In other words, an in-loop deblocking filter apparatus is proposed, configured to process a current row or column of samples (e.g. row 501 in FIG. 5) into a filtered row or column of samples. The current row or column of samples comprises N samples from a first sample block (e.g. block 503a) and N samples from a second sample block (e.g. block 503b) of a reconstructed picture of a video stream. The first sample block and the second sample block adjoin each other in a vertical or horizontal edge (e.g. edge 505). N is an even integer greater than or equal to 4. The N samples from the first sample block have sample values $p_i$, $i \in 0, \ldots, N-1$, wherein i is a sample index that indicates the N samples in an ascending order according to the distances of the N samples to the edge, the sample adjoining the edge having i=0. The N samples from the second sample block have sample values $q_i$, $i \in 0, \ldots, N-1$, wherein i is a sample index that indicates the N samples in an ascending order according to the distances of the N samples to the edge, the sample adjoining the edge having i=0. The filter apparatus comprises processing circuitry configured to:

determine (i) whether a first condition is satisfied, the first condition being:

$$((|p_{N-1} - 2 \cdot p_{N/2} + p_1| + |q_{N-1} - 2 \cdot q_{N/2} + q_1|) \ll 1) < \frac{\beta}{k}$$

wherein β denotes a threshold parameter, k is a positive integer and the symbol "<<" denotes the left shift operation, or (ii) whether a second condition is satisfied, the second condition being:

$$\left(\left(\sum_{i=1}^{N-2} |SDpi + SDqi|\right) \ll 1\right) < (N-2) \cdot \frac{\beta}{k}$$

wherein $SDp_i = |p_{i-1} - 2 \cdot p_i + p_{i+1}|$, $SDq_i = |q_{i-1} - 2 \cdot q_i + q_{i+1}|$ for $i \in [1, 2, \ldots, N-2]$ and β denotes a threshold parameter and k is a positive integer; and if the first condition or the second condition is satisfied, process the current row or column of samples into the filtered row or column of samples by:

determining, for the sample with sample index i=0 from the second block, a filtered sample value $q_0'$ by applying a (2N–1)-tap filter to the sample values $p_{N-2}, \ldots, p_0$, $q_0, \ldots, q_{N-1}$ of the current row or column, the (2N−1)-tap filter having 2N−1 filter coefficients, wherein the 2N−1 filter coefficients comprise: a filter coefficient for the sample value $q_0$, which is equal to 2, and filter coefficients for the sample values $p_{N-2}, \ldots, p_0$ and $q_1, \ldots, q_{N-1}$, which are equal to 1; and/or determining, for the sample with sample index i=0 from the first block, a filtered sample value $p_0'$ by applying a (2N−1)-tap filter to the sample values $p_{N-1}, \ldots, p_0, q_0, \ldots, q_{N-2}$ of the current row or column, the (2N−1)-tap filter having 2N−1 filter coefficients, wherein the 2N−1 filter coefficients comprise: a filter coefficient for the sample value $p_0$, which is equal to 2, and filter coefficients for the sample values $p_{N-2}, \ldots, p_1$ $p_{N-1}, \ldots, p_1$ and $q_0, \ldots, q_{N-1}$, which are equal to 1.

Thus, an improved in-loop deblocking filter apparatus is provided allowing for a more efficient removal of blocking artifacts. The threshold parameter β is constant throughout the video stream. β an be stored in the decoder and does not need to be transmitted from the encoder to the decoder. The positive integer k may be defined per slice or per frame or even per block. The value k may be encoded in the encoded (i.e. compressed) video stream. k can be determined by an encoder using Rate Distortion (RD) cost, for example, or using any subjective metric. It can be convenient to chose k to be a multiple of 2. The greater the value of k, the weaker will be the filter. For example, k may be 1, 2, 4, 8, or 16.

In a further possible implementation form of the first aspect, the processing circuitry is configured to, if the first condition or the second condition is satisfied, process the current row or column of samples into the filtered row or column of samples by determining a filtered sample value $q_1'$ of the second sample of the current row or column of samples to the right or bottom of the vertical or horizontal edge between the first and the second sample block by applying a (2N−2) tap filter having 2N−2 filter coefficients to the sample values of the current row or column of samples, wherein the filter coefficient for the sample value $q_0$ of the first sample of the current row or column of samples to the right or bottom of the vertical or horizontal edge is equal to 3, wherein the filter coefficients for the sample values $p_{N-1}$ and $p_{N-2}$ of the farthest samples of the current row or column of samples to the left or top of the vertical or horizontal edge are equal to 0, and the filter coefficients for the other sample values are equal to 1; and/or by determining a filtered sample value $p_1'$ of the second sample of the current row or column of samples to the left or top of the vertical or horizontal edge between the first and the second sample block by applying a (2N−2) tap filter having 2N−2 filter coefficients to the sample values of the current row or column of samples, wherein the filter coefficient for the sample value $p_0$ of the first sample of the current row or column of samples to the left or top of the vertical or horizontal edge is equal to 3, wherein the filter coefficients for the sample values $q_{N-1}$ and $q_{N-2}$ of the farthest samples of the current row or column of samples to the right or bottom of the vertical or horizontal edge are equal to 0, and the filter coefficients for the other sample values are equal to 1.

In a further possible implementation form of the first aspect, the processing circuitry is configured to, if the first condition or the second condition is satisfied and also as a pre-requisite all the other HEVC strong filter conditions are satisfied (as shown in FIG. 9), process the current row or column of samples into the filtered row or column of samples, by determining the filtered sample values $p_{N-2}', p_{N-3}', \ldots, p_2'$ on the basis of a padded version of the (2N−2) tap filter used for determining the filtered sample value $p_1'$ and/or the filtered sample values $q_{N-2}', q_{N-3}', \ldots, q_2'$ on the basis of a padded version of the (2N−2) tap filter used for determining the filtered sample value $q_1'$.

In a further possible implementation form of the first aspect, the processing circuitry is further configured to determine the threshold parameter β on the basis of a quantization parameter, QP, associated with a quantization step size of the plurality of samples.

In a further possible implementation form of the first aspect, the processing circuitry is further configured to determine the threshold parameter β on the basis of the quantization parameter, QP, using a look-up table.

In a further possible implementation form of the first aspect, the processing circuitry is further configured to determine (iii) whether a third condition is satisfied that the width or the height of the first sample block and the horizontally or vertically neighboring second sample block is larger than N samples and, process the current row or column of samples into the filtered row or column of samples, if the first condition and the third condition or the second condition and the third condition is satisfied.

In a further possible implementation form of the first aspect, N is equal to 8 and the processing circuitry is configured to: determine (i) whether the first condition defined by the following equation is satisfied:

$$((|p_7 - 2 \cdot p_4 + p_1| + |q_7 - 2 \cdot q_4 + q_1|) \ll 1) < \frac{\beta}{k},$$

or (ii) Whether the second condition defined by the following equation is satisfied:

$$\left(\left(\sum_{i=2}^{6} |SDpi + SDqi|\right) \ll 1\right) < 6 \cdot \frac{\beta}{k},$$

or (iii) Whether the third condition defined by the following equation is satisfied:

$$\left(\left(\sum_{i=2}^{6} |SDpi + SDqi|\right) \ll 1\right) < 5 \cdot \frac{\beta}{k}$$

$SDp_i = |p_{i-1} - 2 \cdot p_i + p_{i+1}|$, $SDq_i = |q_{i-1} - 2 \cdot q_i + q_{i+1}|$ for $i \in [2, \ldots, N-2]$, where N=8, (note that the case "I==1" is not included, because it has already been checked in the HEVC strong filter condition and therefore need not be re-checked) or (iv) Whether the fourth condition defined by the following equation is satisfied:

$$((|p_7 - 2 \cdot p_4 + p_1| + |q_7 - 2 \cdot q_4 + q_1|) \ll 1) < \frac{\beta}{k} \&\&$$

$$((|p_5 - p_3 - p_2 + p_0| + |q_5 - q_3 - q_2 + q_0|) \ll 1) < \frac{\beta}{k}$$

or (v) Whether the fifth condition defined by the following equation is satisfied:

$$((|p_0 - p_3 - p_4 + p_7| + |q_0 - q_3 - q_4 + q_7|) \ll 1) < \frac{\beta}{k} \,\&\&$$

$$((|p_0 - p_2 - p_3 + p_5| + |q_0 - q_2 - q_3 + q_5|) \ll 1) < \frac{\beta}{k}$$

or (vi) Whether the sixth condition defined by the following equation is satisfied:

$$((|p_0 - p_2 - p_5 + p_7| + |q_0 - q_2 - q_5 + q_7|) \ll 1) < \frac{\beta}{k} \,\&\&$$

$$((|p_0 - p_1 - p_4 + p_5| + |q_0 - q_1 - q_4 + q_5|) \ll 1) < \frac{\beta}{k}$$

satisfied and
if the first condition, second, third, fourth, fifth or sixth condition is satisfied, process the current row or column of samples into the filtered row or column of samples by determining the filtered sample value $q_0'$ of the first sample of the current row or column of samples to the right or bottom of a vertically or horizontally edge between the first and the second sample block on the basis of the following equation:

$$q_0' = (0 \cdot p_7 + 1 \cdot p_6 + 1 \cdot p_5 + 1 \cdot p_4 + 1 \cdot p_3 + 1 \cdot p_2 + 1 \cdot p_1 + 1 \cdot p_0 + 2 \cdot q_0 + 1 \cdot q_1 + 1 \cdot q_2 + 1 \cdot q_3 + 1 \cdot q_4 + 1 \cdot q_5 + 1 \cdot q_6 + 1 \cdot q_7 + 8)/16; \text{ and/}$$

or by determining the filtered sample value $p_0'$ of the first sample of the current row or column of samples to the left or top of a vertically or horizontally edge between the first and the second sample block on the basis of the following equation:

$$p_0' = (1 \cdot p_7 + 1 \cdot p_6 + 1 \cdot p_5 + 1 \cdot p_4 + 1 \cdot p_3 + 1 \cdot p_2 + 1 \cdot p_1 + 2 \cdot p_0 + 1 \cdot q_0 + 1 \cdot q_1 + 1 \cdot q_2 + 1 \cdot q_3 + 1 \cdot q_4 + 1 \cdot q_5 + 1 \cdot q_6 + 0 \cdot q_7 + 8)/16.$$

In a further possible implementation form of the first aspect, the processing circuitry is configured to, if the first condition or the second condition is satisfied, process the current row or column of samples into the filtered row or column of samples by determining a filtered sample value $q_1'$ of the second sample of the current row or column of samples to the right or bottom of the vertically or horizontally edge between the first and the second sample block on the basis of the following equation:

$$q_1' = (0 \cdot p_7 + 0 \cdot p_6 + 1 \cdot p_5 + 1 \cdot p_4 + 1 \cdot p_3 + 1 \cdot p_2 + 1 \cdot p_1 + 2 \cdot p_0 + 1 \cdot q_0 + 3 \cdot q_1 + 1 \cdot q_2 + 1 \cdot q_3 + 1 \cdot q_4 + 1 \cdot q_5 + 1 \cdot q_6 + 1 \cdot q_7 + 8)/16; \text{ and/}$$

or by determining a filtered sample value $p_1'$ of the second sample of the current row or column of samples to the left or top of the vertically or horizontally edge between the first and the second sample block on the basis of the following equation:

$$p_1' = (1 \cdot p_7 + 1 \cdot p_6 + 1 \cdot p_5 + 1 \cdot p_4 + 1 \cdot p_3 + 3 \cdot p_1 + 2 \cdot p_0 + 1 \cdot q_0 + 1 \cdot q_1 + 1 \cdot q_2 + 1 \cdot q_3 + 1 \cdot q_4 + 1 \cdot q_5 + 0 \cdot q_6 + 0 \cdot q_7 + 8)/16.$$

In a further possible implementation form of the first aspect, the processing circuitry is configured to, if the first condition or the second condition is satisfied, process the current row or column of samples into the filtered row or column of samples by determining a filtered sample value $q_2'$ of the third sample of the current row or column of samples to the right or bottom of the vertically or horizontally edge between the first and the second sample block on the basis of the following equation:

$$q_2' = (0 \cdot p_7 + 0 \cdot p_6 + 1 \cdot p_5 + 1 \cdot p_4 + 1 \cdot p_3 + 1 \cdot p_2 + 1 \cdot p_1 + 1 \cdot p_0 + 1 \cdot q_0 + 1 \cdot q_1 + 3 \cdot q_2 + 1 \cdot q_3 + 1 \cdot q_4 + 1 \cdot q_5 + 1 \cdot q_6 + 2 \cdot q_7 + 8)/16; \text{ and/}$$

or by determining a filtered sample value $p_2'$ of the third sample of the current row or column of samples to the left or top of the vertically or horizontally edge between the first and the second sample block on the basis of the following equation:

$$p_2' = (2 \cdot p_7 + 1 \cdot p_6 + 1 \cdot p_5 + 1 \cdot p_4 + 1 \cdot p_3 + 1 \cdot p_2 + 1 \cdot p_1 + 1 \cdot p_0 + 1 \cdot q_0 + 1 \cdot q_1 + 1 \cdot q_2 + 1 \cdot q_3 + 1 \cdot q_4 + 0 \cdot q_5 + 0 \cdot q_6 + 0 \cdot q_7 + 8)/16.$$

In a further possible implementation form of the first aspect, the processing circuitry is configured to, if the first condition or the second condition is satisfied, process the current row or column of samples into the filtered row or column of samples by determining a filtered sample value $q_3'$ of the fourth sample of the current row or column of samples to the right or bottom of the vertically or horizontally edge between the first and the second sample block on the basis of the following equation:

$$q_3' = (0 \cdot p_7 + 0 \cdot p_6 + 0 \cdot p_5 + 1 \cdot p_4 + 1 \cdot p_3 + 1 \cdot p_2 + 1 \cdot p_1 + 1 \cdot p_0 + 1 \cdot q_0 + 1 \cdot q_1 + 1 \cdot q_2 + 3 \cdot q_3 + 1 \cdot q_4 + 1 \cdot q_5 + 1 \cdot q_6 + 3 \cdot q_7 + 8)/16; \text{ and/}$$

or by determining a filtered sample value $p_3'$ of the fourth sample of the current row or column of samples to the left or top of the vertically or horizontally edge between the first and the second sample block on the basis of the following equation:

$$p_3' = (3 \cdot p_7 + 1 \cdot p_6 + 1 \cdot p_5 + 1 \cdot p_4 + 3 \cdot p_3 + 1 \cdot p_2 + 1 \cdot p_1 + 1 \cdot p_0 + 1 \cdot q_0 + 1 \cdot q_1 + 1 \cdot q_2 + 1 \cdot q_3 + 0 \cdot q_4 + 0 \cdot q_5 + 0 \cdot q_6 + 0 \cdot q_7 + 8)/16.$$

In a further possible implementation form of the first aspect, the processing circuitry is configured to, if the first condition or the second condition is satisfied, process the current row or column of samples into the filtered row or column of samples by determining a filtered sample value $q_4'$ of the fifth sample of the current row or column of samples to the right or bottom of the vertically or horizontally edge between the first and the second sample block on the basis of the following equation:

$$q_4' = (0 \cdot p_7 + 0 \cdot p_6 + 0 \cdot p_5 + 0 \cdot p_4 + 1 \cdot p_3 + 1 \cdot p_2 + 1 \cdot p_1 + 1 \cdot p_0 + 1 \cdot q_0 + 1 \cdot q_1 + 1 \cdot q_2 + 1 \cdot q_3 + 3 \cdot q_4 + 1 \cdot q_5 + 1 \cdot q_6 + 4 \cdot q_7 + 8)/16; \text{ and/}$$

or by determining a filtered sample value $p_4'$ of the fifth sample of the current row or column of samples to the left or top of the vertically or horizontally edge between the first and the second sample block on the basis of the following equation:

$$p_4' = (4 \cdot p_7 + 1 \cdot p_6 + 1 \cdot p_5 + 3 \cdot p_4 + 1 \cdot p_3 + 1 \cdot p_2 + 1 \cdot p_1 + 1 \cdot p_0 + 1 \cdot q_0 + 1 \cdot q_1 + 1 \cdot q_2 + 0 \cdot q_3 + 0 \cdot q_4 + 0 \cdot q_5 + 0 \cdot q_6 + 0 \cdot q_7 + 8)/16.$$

In a further possible implementation form of the first aspect, the processing circuitry is configured to, if the first condition or the second condition is satisfied, process the current row or column of samples into the filtered row or column of samples by determining a filtered sample value $q_5'$ of the sixth sample of the current row or column of samples to the right or bottom of the vertically or horizontally edge between the first and the second sample block on the basis of the following equation:

$$q_5' = (0 \cdot p_7 + 0 \cdot p_6 + 0 \cdot p_5 + 0 \cdot p_4 + 0 \cdot p_3 + 1 \cdot p_2 + 1 \cdot p_1 + 1 \cdot p_0 + 1 \cdot q_0 + 1 \cdot q_1 + 1 \cdot q_2 + 1 \cdot q_3 + 1 \cdot q_4 + 3 \cdot q_5 + 1 \cdot q_6 + 5 \cdot q_7 + 8)/16; \text{ and/}$$

or by determining a filtered sample value $p_5'$ of the sixth sample of the current row or column of samples to the left or top of the vertically or horizontally edge between the first and the second sample block on the basis of the following equation:

$$p_5'=(5 \cdot p_7+1 \cdot p_6+3 \cdot p_5+1 \cdot p_4+1 \cdot p_3+1 \cdot p_2+1 \cdot p_1+1 \cdot p_0+1 \cdot q_0+1 \cdot q_1+0 \cdot q_2+0 \cdot q_3+0 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_6'$ of the seventh sample of the current row or column of samples to the right or bottom of the vertically or horizontally edge between the first and the second sample block on the basis of the following equation:

$$q_6'=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+1 \cdot q_1+1 \cdot q_2+1 \cdot q_3+1 \cdot q_4+1 \cdot q_5+3 \cdot q_6+6 \cdot q_7+8)/16; \text{ and/} \text{or}$$

by determining a filtered sample value $p_6'$ of the seventh sample of the current row or column of samples to the left or top of the vertically or horizontally edge between the first and the second sample block on the basis of the following equation:

$$p_6'=(6 \cdot p_7+3 \cdot p_6+1 \cdot p_5+1 \cdot p_4+1 \cdot p_3+1 \cdot p_2+1 \cdot p_1+1 \cdot p_0+1 \cdot q_0+0 \cdot q_1+0 \cdot q_2+0 \cdot q_3+0 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_1'$ of the second sample of the current row or column of samples to the right or bottom of the vertically or horizontally edge between the first and the second sample block on the basis of the following equation:

$$q_1'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+4 \cdot q_1+1 \cdot q_2+1 \cdot q_3+1 \cdot q_4+1 \cdot q_5+1 \cdot q_6+1 \cdot q_7+8)/16; \text{ and/} \text{or}$$

by determining a filtered sample value $p_1'$ of the second sample of the current row or column of samples to the left or top of the vertically or horizontally edge between the first and the second sample block on the basis of the following equation:

$$p_1'=(1 \cdot p_7+1 \cdot p_6+1 \cdot p_5+1 \cdot p_4+1 \cdot p_3+1 \cdot p_2+4 \cdot p_1+1 \cdot p_0+1 \cdot q_0+1 \cdot q_1+1 \cdot q_2+1 \cdot q_3+1 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_2'$ of the third sample of the current row or column of samples to the right or bottom of the vertically or horizontally edge between the first and the second sample block on the basis of the following equation:

$$q_2'=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+1 \cdot q_1+4 \cdot q_2+1 \cdot q_3+1 \cdot q_4+1 \cdot q_5+1 \cdot q_6+2 \cdot q_7+8)/16; \text{ and/} \text{or}$$

by determining a filtered sample value $p_2'$ of the third sample of the current row or column of samples to the left or top of the vertically or horizontally edge between the first and the second sample block on the basis of the following equation:

$$p_2'=(2 \cdot p_7+1 \cdot p_6+1 \cdot p_5+1 \cdot p_4+1 \cdot p_3+4 \cdot p_2+1 \cdot p_1+1 \cdot p_0+1 \cdot q_0+1 \cdot q_1+1 \cdot q_2+1 \cdot q_3+0 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_3'$ of the fourth sample of the current row or column of samples to the right or bottom of the vertically or horizontally edge between the first and the second sample block on the basis of the following equation:

$$q_3'=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+1 \cdot q_1+1 \cdot q_2+4 \cdot q_3+1 \cdot q_4+1 \cdot q_5+1 \cdot q_6+3 \cdot q_7+8)/16; \text{ and/} \text{or}$$

by determining a filtered sample value $p_3'$ of the fourth sample of the current row or column of samples to the left or top of the vertically or horizontally edge between the first and the second sample block on the basis of the following equation:

$$p_3'=(3 \cdot p_7+1 \cdot p_6+1 \cdot p_5+1 \cdot p_4+4 \cdot p_3+1 \cdot p_2+1 \cdot p_1+1 \cdot p_0+1 \cdot q_0+1 \cdot q_1+1 \cdot q_2+0 \cdot q_3+0 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_4'$ of the fifth sample of the current row or column of samples to the right or bottom of the vertically or horizontally edge between the first and the second sample block on the basis of the following equation:

$$q_4'=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+1 \cdot q_1+1 \cdot q_2+1 \cdot q_3+4 \cdot q_4+1 \cdot q_5+1 \cdot q_6+4 \cdot q_7+8)/16; \text{ and/} \text{or}$$

by determining a filtered sample value $p_4'$ of the fifth sample of the current row or column of samples to the left or top of the vertically or horizontally edge between the first and the second sample block on the basis of the following equation:

$$p_4'=(4 \cdot p_7+1 \cdot p_6+1 \cdot p_5+4 \cdot p_4+1 \cdot p_3+1 \cdot p_2+1 \cdot p_1+1 \cdot p_0+1 \cdot q_0+1 \cdot q_1+0 \cdot q_2+0 \cdot q_3+0 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_5'$ of the sixth sample of the current row or column of samples to the right or bottom of the vertically or horizontally edge between the first and the second sample block on the basis of the following equation:

$$q_5'=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+1 \cdot q_1+1 \cdot q_2+1 \cdot q_3+1 \cdot q_4+4 \cdot q_5+1 \cdot q_6+5 \cdot q_7+8)/16; \text{ and/} \text{or}$$

by determining a filtered sample value $p_5'$ of the sixth sample of the current row or column of samples to the left or top of the vertically or horizontally edge between the first and the second sample block on the basis of the following equation:

$$p_5'=(5 \cdot p_7+1 \cdot p_6+4 \cdot p_5+1 \cdot p_4+1 \cdot p_3+1 \cdot p_2+1 \cdot p_1+1 \cdot p_0+1 \cdot q_0+0 \cdot q_1+0 \cdot q_2+0 \cdot q_3+0 \cdot q_4+0 \cdot q_5+0 \cdot q_6+0 \cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_6'$ of the seventh sample of the current row or column of samples to the right or bottom of the vertically or horizontally edge between the first and the second sample block on the basis of the following equation:

$$q_6'=(0 \cdot p_7+0 \cdot p_6+0 \cdot p_5+0 \cdot p_4+0 \cdot p_3+0 \cdot p_2+0 \cdot p_1+0 \cdot p_0+1 \cdot q_0+1 \cdot q_1+1 \cdot q_2+1 \cdot q_3+1 \cdot q_4+1 \cdot q_5+4 \cdot q_6+6 \cdot q_7+8)/16; \text{ and/} \text{or}$$

by determining a filtered sample value $p_6'$ of the seventh sample of the current row or column of samples to the left or top of the vertically or horizontally edge between the first and the second sample block on the basis of the following equation:

$$p_6'=(6\cdot p_7+4\cdot p_6+1\cdot p_5+1\cdot p_4+1\cdot p_3+1\cdot p_2+1\cdot p_1+1\cdot p_0+0\cdot q_0+0\cdot q_1+0\cdot q_2+0\cdot q_3+0\cdot q_4+0\cdot q_5+0\cdot q_6+0\cdot q_7+8)/16.$$

In a further possible implementation form of the first aspect, the processing circuitry is configured to, if the first condition or the second condition is satisfied, process the current row or column of samples into the filtered row or column of samples by determining a filtered sample value $q_7'$ of the eighth sample of the current row or column of samples to the right or bottom of the vertically or horizontally edge between the first and the second sample block on the basis of the following equation:

$$q_7'=q_7; \text{ and/or}$$

by determining a filtered sample value $p_7'$ of the eighth sample of the current row or column of samples to the left or top of the vertically or horizontally edge between the first and the second sample block on the basis of the following equation:

$$p_7'=p_7.$$

To save the line buffer for the horizontal edges which overlap with the CTU borders, the following alternative equations are proposed.

(vii) Whether the seventh condition defined by the following equation is satisfied:

$$((|p_3 - 2*p_2 + p_1| + |q_7 - 2\cdot q_4 + q_1|) \ll 1) < \frac{\beta}{k} \;\&\&$$

$$((|p_3 - p_2 - p_1 + p_0| + |q_5 - q_3 - q_2 + q_0|) \ll 1) < \frac{\beta}{k} \text{ (or)}$$

(viii) Whether the eight condition defined by the following equation is satisfied:

$$((|p_3 - p_2 - p_1 + p_0| + |q_0 - q_3 + q_4 + q_7|) \ll 1) < \frac{\beta}{k} \;\&\&$$

$$((|p_3 - p_2 - p_1 + p_0| + |q_0 - q_2 - q_3 + q_5|) \ll 1) < \frac{\beta}{k}$$

(ix) Whether the ninth condition defined by the following equation is satisfied:

$$((|p_3 - p_2 - p_1 + p_0| + |q_0 - q_2 - q_5 + q_7|) \ll 1) < \frac{\beta}{k} \;\&\&$$

$$((|p_3 - p_2 - p_1 + p_0| + |q_0 - q_1 - q_4 + q_5|) \ll 1) < \frac{\beta}{k}$$

And if seventh, eighth or ninth condition is satisfied, process the current row or column of samples into the filtered row or column of samples by determining the filtered sample value $p_0'$ of the first sample of the current row or column of samples to the top of the horizontally edge between the first and the second sample block on the basis of the following equation:

$$p_0'=(5\cdot p_3+1\cdot p_2+1\cdot p_1+2\cdot p_0+1\cdot q_0+1\cdot q_1+1\cdot q_2+1\cdot q_3+1\cdot q_4+1\cdot q_5+1\cdot q_6+8)/16$$

by determining a filtered sample value $p_1'$ of the second sample of the current row or column of samples to the top of the horizontally edge between the first and the second sample block on the basis of the following equation:

$$p_1'=(5\cdot p_3+1\cdot p_2+3\cdot p_1+1\cdot p_0+1\cdot q_0+1\cdot q_1+1\cdot q_2+1\cdot q_3+1\cdot q_4+1\cdot q_5++8)/16$$

by determining a filtered sample value $p_2'$ of the third sample of the current row or column of samples to the top of the horizontally edge between the first and the second sample block on the basis of the following equation:

$$p_2'=(6\cdot p_3+3\cdot p_2+1\cdot p_1+1\cdot p_0+1\cdot q_0+1\cdot q_1+1\cdot q_2+1\cdot q_3+1\cdot q_4+8)/16$$

by determining the filtered sample value $q_0'$ of the first sample of the current row column of samples to the bottom of a horizontal edge between the first and the second sample block on the basis of the following equation:

$$q_0'=(4\cdot p_3+1\cdot p_2+1\cdot p_1+1\cdot p_0+2\cdot q_0+1\cdot q_1+1\cdot q_2+1\cdot q_3+1\cdot q_4+1\cdot q_5+1\cdot q_6+1\cdot q_7+8)/16$$

by determining the filtered sample value $q_1'$ of the second sample of the current row or column of samples to the bottom of a horizontal edge between the first and the second sample block on the basis of the following equation:

$$q_1'=(3\cdot p_3+1\cdot p_2+1\cdot p_1+1\cdot p_0+1\cdot q_0+3\cdot q_1+1\cdot q_2+1\cdot q_3+1\cdot q_4+1\cdot q_5+1\cdot q_6+1\cdot q_7+8)/16;$$

by determining the filtered sample value $q_2'$ of the third sample of the current row or column of samples to the bottom of a horizontal edge between the first and the second sample block on the basis of the following equation:

$$q_2'=(2\cdot p_3+1\cdot p_2+1\cdot p_1+1\cdot p_0+1\cdot q_0+1\cdot q_1+3\cdot q_2+1\cdot q_3+1\cdot q_4+1\cdot q_5+1\cdot q_6+2\cdot q_7+8)/16$$

by determining the filtered sample value $q_3'$ of the fourth sample of the current row or column of samples to the bottom of a horizontal edge between the first and the second sample block on the basis of the following equation:

$$q_3'=(1\cdot p_3+1\cdot p_2+1\cdot p_1+1\cdot p_0+1\cdot q_0+1\cdot q_1+1\cdot q_2+3\cdot q_3+1\cdot q_4+1\cdot q_5+1\cdot q_6+3\cdot q_7+8)/16;$$

by determining a filtered sample value $q_4'$ of the fifth sample of the current row or column of samples to the bottom of the horizontally edge between the first and the second sample block on the basis of the following equation:

$$q_4'=(1\cdot p_2+1\cdot p_1+1\cdot p_0+1\cdot q_0+1\cdot q_1+1\cdot q_2+1\cdot q_3+3\cdot q_4+1\cdot q_5+1\cdot q_6+4\cdot q_7+8)/16;$$

by determining a filtered sample value $q_5'$ of the sixth sample of the current row or column of samples to the bottom of the horizontally edge between the first and the second sample block on the basis of the following equation:

$$q_5'=(1\cdot p_1+1\cdot p_0+1\cdot q_0+1\cdot q_1+1\cdot q_2+1\cdot q_3+1\cdot q_4+3\cdot q_5+1\cdot q_6+5\cdot q_7+8)/16;$$

by determining a filtered sample value $q_6'$ of the seventh sample of the current row or column of samples to the bottom of the horizontally edge between the first and the second sample block on the basis of the following equation:

$$q_6'=(1\cdot p_0+1\cdot q_0+1\cdot q_1+1\cdot q_2+1\cdot q_3+1\cdot q_4+1\cdot q_5+3\cdot q_6+6\cdot q_7+8)/16;$$

Or alternatively by determining the filtered sample value $p_0'$ of the first sample of the current row or column of samples to the top of the horizontally edge between the first and the second sample block on the basis of the following equation:

$$p_0'=(2\cdot p_3+2\cdot p_2+2\cdot p_1+2\cdot p_0+2\cdot q_0+2\cdot q_1+2\cdot q_2+2\cdot q_3+8)/16.$$

by determining a filtered sample value $p_1'$ of the second sample of the current row or column of samples to the top of the horizontally edge between the first and the second sample block on the basis of the following equation:

$$p_1'=(2 \cdot p_3+2 \cdot p_2+4 \cdot p_1+2 \cdot p_0+2 \cdot q_0+2 \cdot q_1+1 \cdot q_2+1 \cdot q_3+8)/16.$$

by determining a filtered sample value $p_2'$ of the third sample of the current row or column of samples to the top of the horizontally edge between the first and the second sample block on the basis of the following equation:

$$p_2'=(3 \cdot p_3+5 \cdot p_2+2 \cdot p_1+2 \cdot p_0+1 \cdot q_0+1 \cdot q_1+1 \cdot q_2+1 \cdot q_3+8)/16.$$

by determining the filtered sample value $q_0'$ of the first sample of the current row column of samples to the bottom of a horizontal edge between the first and the second sample block on the basis of the following equation:

$$q_0'=(1 \cdot p_3+2 \cdot p_2+2 \cdot p_1+2 \cdot p_0+2 \cdot q_0+2 \cdot q_1+2 \cdot q_2+2 \cdot q_3+1 \cdot q_4+8)/16.$$

by determining the filtered sample value $q_1'$ of the second sample of the current row or column of samples to the bottom of a horizontal edge between the first and the second sample block on the basis of the following equation:

$$q_0'=(1 \cdot p_3+1 \cdot p_2+2 \cdot p_1+2 \cdot p_0+2 \cdot q_0+2 \cdot q_1+2 \cdot q_2+2 \cdot q_3+1 \cdot q_4+1 \cdot q_5+8)/16.$$

by determining the filtered sample value $q_2'$ of the third sample of the current row or column of samples to the bottom of a horizontal edge between the first and the second sample block on the basis of the following equation:

$$q_2'=(1 \cdot p_3+1 \cdot p_2+1 \cdot p_1+2 \cdot p_0+2 \cdot q_0+2 \cdot q_1+2 \cdot q_2+2 \cdot q_3+2 \cdot q_4+1 \cdot q_5+8)/16.$$

by determining the filtered sample value $q_3'$ of the fourth sample of the current row or column of samples to the bottom of a horizontal edge between the first and the second sample block on the basis of the following equation:

$$q_3'=(1 \cdot p_3+1 \cdot p_2+1 \cdot p_1+1 \cdot p_0+1 \cdot q_0+2 \cdot q_1+2 \cdot q_2+2 \cdot q_3+2 \cdot q_4+2 \cdot q_5+1 \cdot q_0+8)/16.$$

by determining the filtered sample value $q_4'$ of the fifth sample of the current row column of samples to the bottom of a horizontal edge between the first and the second sample block on the basis of the following equation:

$$q_4'=(1 \cdot p_2+1 \cdot p_1+1 \cdot p_0+1 \cdot q_0+1 \cdot q_1+1 \cdot q_2+3 \cdot q_3+3 \cdot q_4+3 \cdot q_5+1 \cdot q_0+8)/16.$$

by determining the filtered sample value $q_5'$ of the sixth sample of the current row column of samples to the bottom of a horizontal edge between the first and the second sample block on the basis of the following equation:

$$q_5'=(1 \cdot p_1+1 \cdot p_0+1 \cdot q_0+1 \cdot q_1+1 \cdot q_2+1 \cdot q_3+2 \cdot q_4+5 \cdot q_5+2 \cdot q_0+1 \cdot q_7+8)/16.$$

by determining the filtered sample value $q_6'$ of the seventh sample of the current row column of samples to the bottom of a horizontal edge between the first and the second sample block on the basis of the following equation:

$$q_6'=(1 \cdot p_0+1 \cdot q_0+1 \cdot q_1+1 \cdot q_2+1 \cdot q_3+1 \cdot q_4+2 \cdot q_5+5 \cdot q_6+3 \cdot q_7+8)/16.$$

According to a second aspect the invention relates to a video encoding apparatus for encoding a picture of a video stream, wherein the video encoding apparatus comprises: a reconstruction unit configured to reconstruct the picture; and a filter apparatus according to the first aspect of the invention for processing the reconstructed picture into a filtered reconstructed picture.

According to a third aspect the invention relates to a video decoding apparatus for decoding a picture of an encoded video stream, wherein the video decoding apparatus comprises: a reconstruction unit configured to reconstruct the picture; and a filter apparatus according to the first aspect of the invention for processing the reconstructed picture into a filtered reconstructed picture.

According to a fourth aspect the invention relates to a method for processing a current row or column of samples into a filtered row or column of samples, wherein the current row or column of samples comprises samples from a first sample block and a horizontally or vertically neighboring second sample block of a reconstructed picture of a video stream and wherein each sample of the current row or column of samples has a sample value $p_{N-1} - p_0$, $q_0 - q_{N-1}$ with N being an even integer larger than 2, wherein the method comprises:

determining (i) whether a first condition defined by the following equation is satisfied:

$$((|p_{N-1} - 2 \cdot p_{N/2} + p_1| + |q_{N-1} - 2 \cdot q_{N/2} + q_1|) \ll 1) < \frac{\beta}{k}$$

wherein $\beta$ denotes a threshold parameter and the symbol "$\ll$" denotes the left shift operation and k is a positive integer, or (ii) whether a second condition defined by the following equation is satisfied:

$$\left(\left(\sum_{i=1}^{N-2} |SDpi + SDqi|\right) \ll 1\right) < (N-2) \cdot \frac{\beta}{k},$$

wherein $SDp_i=|p_{i-1}-2 \cdot p_i+p_i+p_{i+1}|$, $SDq_i=|q_{i-1}-2 \cdot q_i+q_{i+1}|$ for $i \in [1, 2, \ldots, N-2]$ and $\beta$ denotes a threshold parameter and k is a positive integer; and if the first condition or the second condition is satisfied, processing the current row or column of samples into the filtered row or column of samples by determining a filtered sample value $q_0'$ of the first sample of the current row or column of samples to the right or bottom of a vertical or horizontal edge between the first and the second sample block by applying a (2N-1)-tap filter having 2N-1 filter coefficients to the sample values of the current row or column of samples, wherein the filter coefficient for the sample value $q_0$ of the first sample of the current row or column of samples to the right or bottom of the vertical or horizontal edge is equal to 2, wherein the filter coefficient for the sample value $p_{N-1}$ of the farthest sample of the current row or column of samples to the left or top of the vertical or horizontal edge is equal to 0, and the filter coefficients for the other sample values are equal to 1; and/or by determining a filtered sample value $p_0'$ of the first sample of the current row or column of samples to the left or top of a vertical or horizontal edge between the first and the second sample block by applying a (2N-1)-tap filter having 2N-1 filter coefficients to the sample values of the current row or column of samples, wherein the filter coefficient for the sample value $p_0$ of the first sample of the current row or column of samples to the left or top of the vertical or horizontal edge is equal to 2, wherein the filter coefficient for the sample value $q_{N-1}$ of the farthest sample of the current row or column of samples to the right or bottom of the vertical or horizontal edge is equal to 0, and the filter coefficients for the other sample values are equal to 1.

The filtering method according to the fourth aspect of the invention can be performed by the filter apparatus according to the first aspect of the invention. Further features of the filtering method according to the fourth aspect of the invention result directly from the functionality of the filter apparatus according to the first aspect of the invention and its different implementation forms described above and below.

According to a fifth aspect the invention relates to a computer program product comprising program code for performing the method according to the fourth aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIG. 6 is a diagram illustrating a coefficient matrix used by a filter apparatus according to an embodiment;

Figure 1:
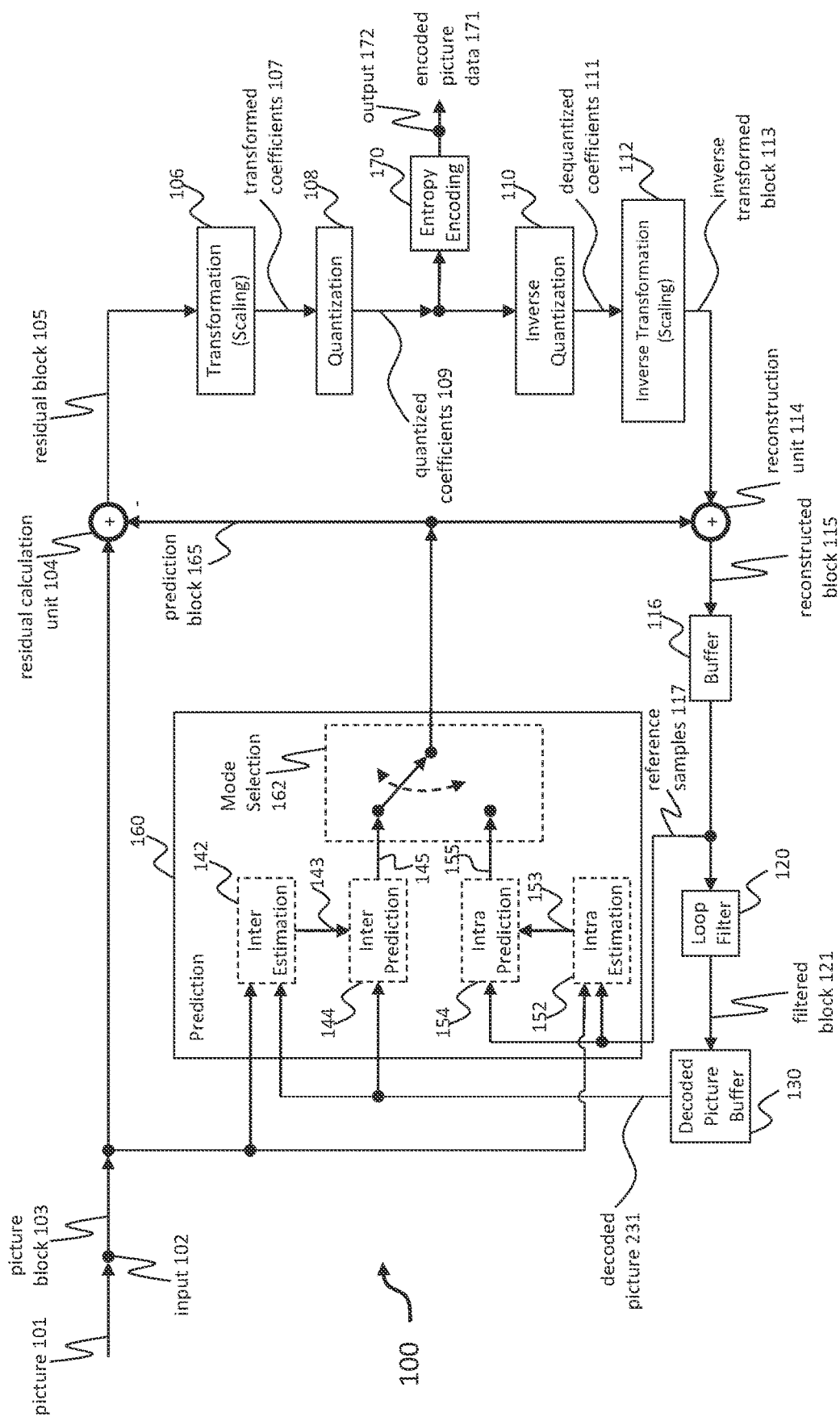
FIG. 1 is a block diagram showing an example of a video encoder configured to implement embodiments of the invention.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the invention may be used. It is understood that embodiments of the invention may be used in other aspects and comprise structural or logical changes not depicted in the figures. The following detailed description, therefore, is not to be taken in a limiting sense, and the scope of the invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3.

Figure 3:
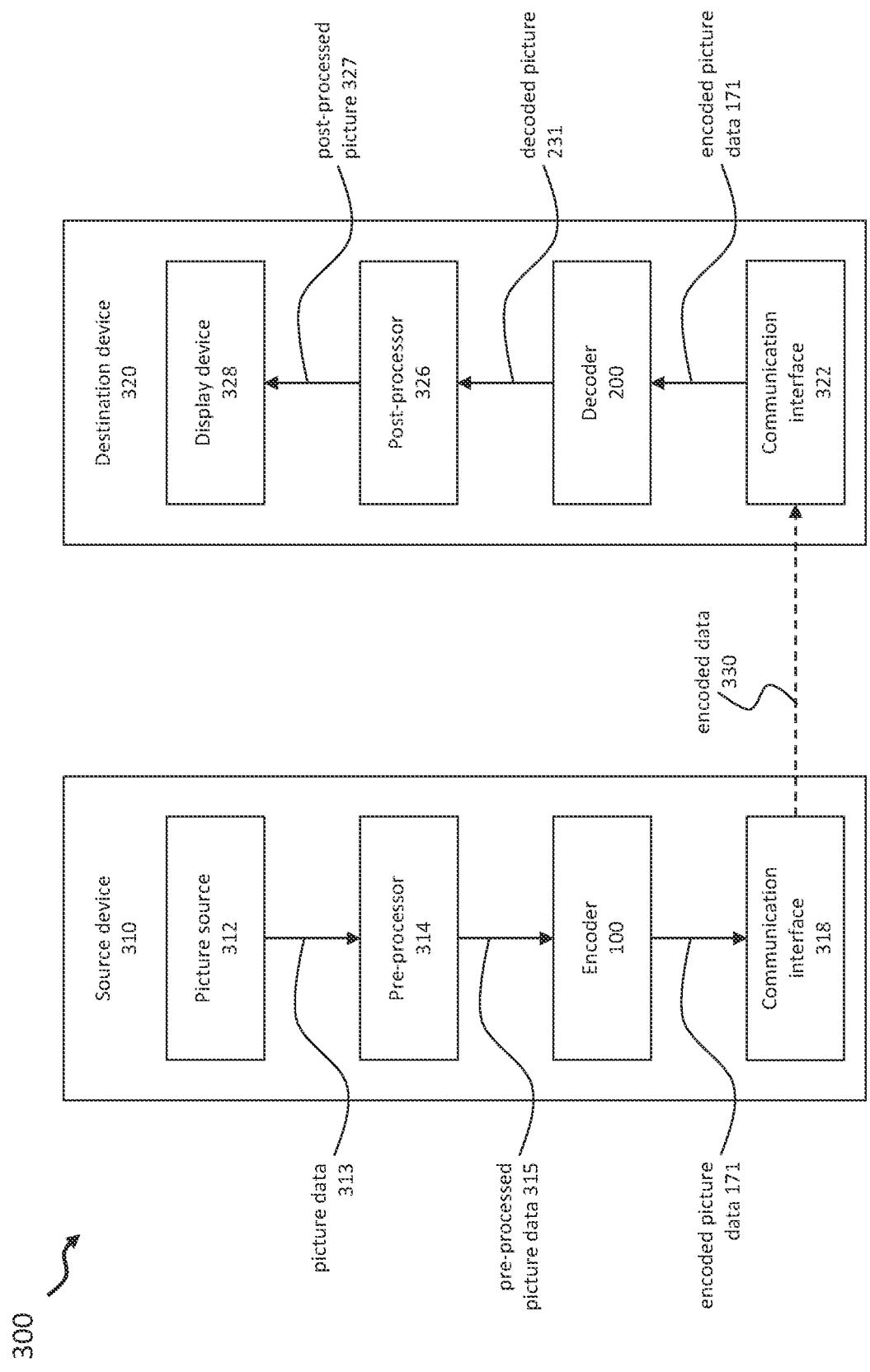
FIG. 3 is a block diagram showing an example of a video coding system configured to implement embodiments of the invention.

FIG. 3 is a conceptional or schematic block diagram illustrating an embodiment of a coding system 300, e.g., a picture coding system 300, wherein the coding system 300 comprises a source device 310 configured to provide encoded data 330, e.g., an encoded picture 330, e.g., to a destination device 320 for decoding the encoded data 330.

The source device 310 comprises an encoder 100 or encoding unit 100, and may additionally, i.e. optionally, comprise a picture source 312, a pre-processing unit 314, e.g., a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture). In the following, all these kinds of pictures and any other kind of picture will be referred to as "picture", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

The pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g., from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g., the destination device 320 or any other device, for storage or direct reconstruction, or to process the encoded picture data 171 for respectively before storing the encoded data 330 and/or transmitting the encoded data 330 to another device, e.g., the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g., directly from the source device 310 or from any other source, e.g., a memory, e.g., an encoded picture data memory.

The communication interface 318 and the communication interface 322 may be configured to transmit respectively receive the encoded picture data 171 or encoded data 330 via a direct communication link between the source device 310 and the destination device 320, e.g., a direct wired or wireless connection, or via any kind of network, e.g., a wired or wireless network or any combination thereof, or any kind of private and public network, or any kind of combination thereof.

The communication interface 318 may be, e.g., configured to package the encoded picture data 171 into an appropriate format, e.g., packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g., comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g., to send and receive messages, e.g., to set up a connection, to acknowledge and/or re-send lost or delayed data including picture data, and exchange any other information related to the communication link and/or data transmission, e.g., encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g., the decoded picture 231, to obtain post-processed picture data 327, e.g., a post-processed picture 327. The post-processing performed by the post-processing unit 326 may comprise, e.g., color format conversion (e.g., from YCbCr to RGB), color correction, trimming, or re-sampling, or any other processing, e.g., for preparing the decoded picture data 231 for display, e.g., by display device 328.

The display device 328 of the destination device 320 is configured to receive the post-processed picture data 327 for displaying the picture, e.g., to a user or viewer. The display device 328 may be or comprise any kind of display for representing the reconstructed picture, e.g., an integrated or external display or monitor. The displays may, e.g., comprise cathode ray tubes (CRT), liquid crystal displays (LCD), plasma displays, organic light emitting diodes (OLED) displays or any kind of other display.

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments for implementing the invention and embodiments of the invention are not limited to those shown in FIG. 3.

Source device 310 and destination device 320 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices, broadcast receiver device, or the like and may use no or any kind of operating system.

Encoder & Encoding Method

FIG. 1 shows a schematic/conceptual block diagram of an embodiment of an encoder 100, e.g., a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter apparatus 120 according to an embodiment, a decoded picture buffer (DPB) 130, a prediction unit 160, including an inter estimation unit 142, an inter prediction unit 144, an intra-estimation unit 152, and an intra-prediction unit 154, a mode selection unit 162, an entropy encoding unit 170, and an output 172. A video encoder 100 as shown in FIG. 1 may also be referred to as hybrid video encoder or a video encoder according to a hybrid video codec.

Figure 2:
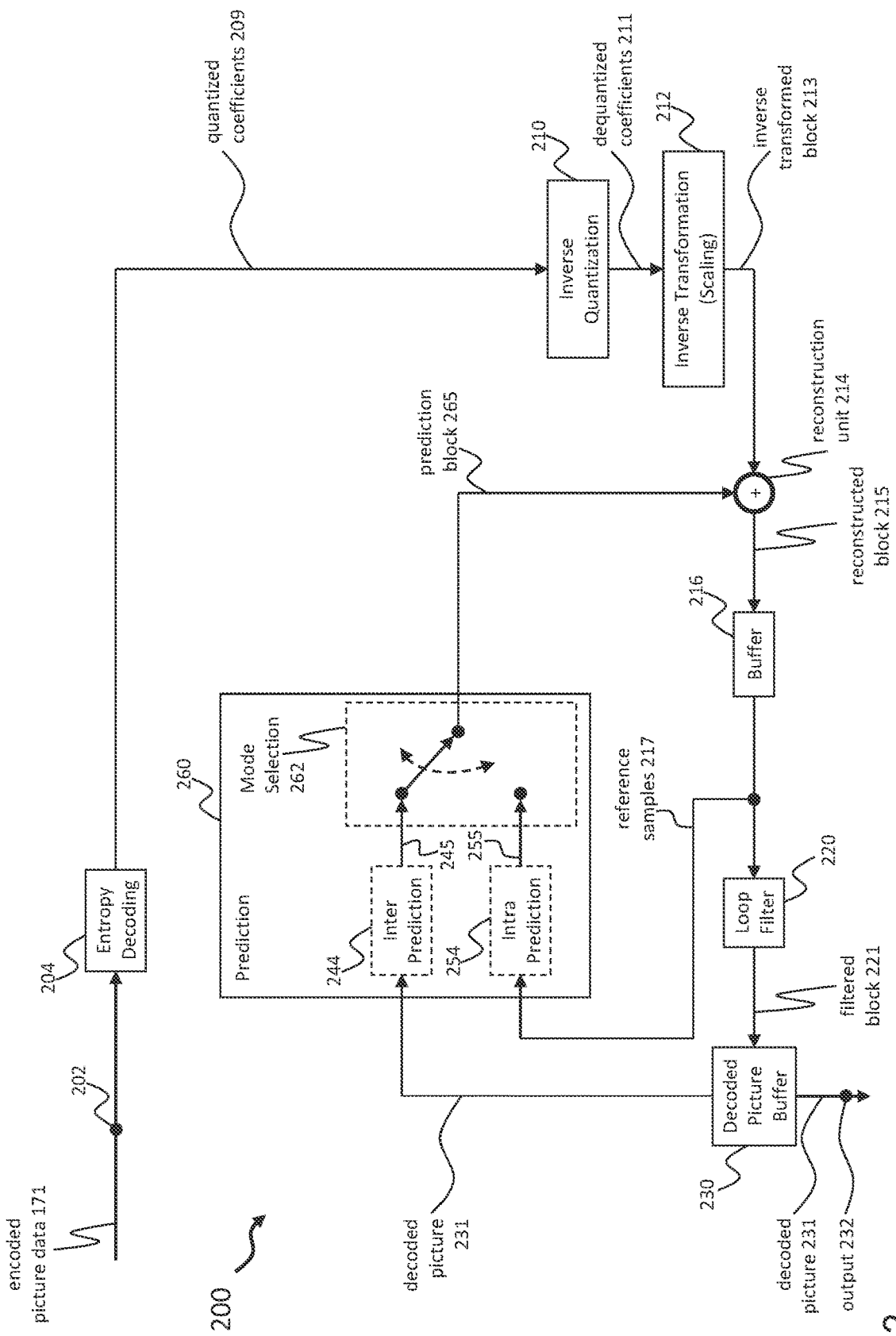
FIG. 2 is a block diagram showing an example structure of a video decoder configured to implement embodiments of the invention.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120 according to an embodiment, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g., by input 102, a picture 101 or a picture block 103 of the picture 101, e.g., picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g., previously encoded and/or decoded pictures of the same video sequence, i.e. the video sequence which also comprises the current picture).

Partitioning

Embodiments of the encoder 100 may comprise a partitioning unit (not depicted in FIG. 1), e.g., which may also be referred to as picture partitioning unit, configured to partition the picture 103 into a plurality of blocks, e.g., blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g., a luma array in case of a monochrome picture 101) or three sample arrays (e.g., a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g., the encoding and prediction is performed per block 103.

Residual Calculation

The residual calculation unit 104 is configured to calculate a residual block 105 based on the picture block 103 and a prediction block 165 (further details about the prediction block 165 are provided later), e.g., by subtracting sample values of the prediction block 165 from sample values of the picture block 103, sample by sample (pixel by pixel) to obtain the residual block 105 in the sample domain.

Transformation

The transformation unit 106 is configured to apply a transformation, e.g., a spatial frequency transform or a linear spatial transform, e.g., a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block 105 which is processed by forward and inverse transforms, additional scaling factors can be applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g., by inverse transformation unit 212, at the decoder 200 (and the corresponding inverse transform, e.g., by inverse transformation unit 112 at the encoder 100) and corresponding scaling factors for the forward transform, e.g., by transformation unit 106, at the encoder 100 may be specified accordingly.

Quantization

The quantization unit 108 is configured to quantize the transformed coefficients 107 to obtain quantized coefficients 109, e.g., by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g., by inverse quantization 110, may include multiplication by the quantization step size. Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from the encoder 100 to the decoder 200, e.g., in a bitstream. The quantization is a lossy operation, wherein the loss increases with increasing quantization step sizes.

Embodiments of the encoder 100 may be configured to output the quantization scheme and quantization step size, e.g., by means of the corresponding quantization parameter, so that the decoder 200 may receive and apply the corresponding inverse quantization. Embodiments of the encoder 100 (or quantization unit 108) may be configured to output the quantization scheme and quantization step size, e.g., directly or entropy encoded via the entropy encoding unit 170 or any other entropy coding unit.

The inverse quantization unit 110 of the encoder 100 is configured to apply the inverse quantization of the quantization unit 108 on the quantized coefficients to obtain dequantized coefficients 111, e.g., by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 of the encoder 100 is configured to apply the inverse transformation of the transformation applied by the transformation unit 106, e.g., an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 of the encoder 100 is configured to combine the inverse transformed block 113 and the prediction block 165 to obtain a reconstructed block 115 in the sample domain, e.g., by sample wise adding the sample values of the decoded residual block 113 and the sample values of the prediction block 165.

The buffer unit 116 (or short "buffer" 116), e.g., a line buffer 116, is configured to buffer or store the reconstructed block 115 and the respective sample values, for example for intra estimation and/or intra prediction. In further embodiments, the encoder 100 may be configured to use unfiltered reconstructed blocks and/or the respective sample values stored in buffer unit 116 for any kind of estimation and/or prediction.

As will be described in more detail further below, embodiments of the invention relate to a in-loop deblocking filter apparatus (or short "filter apparatus") 120 of the encoder 100 and a corresponding in-loop deblocking filter apparatus (or short "filter apparatus") 220 of the decoder 200. Generally, the filter apparatus 120, 220 according to an embodiment is configured to process a reconstructed picture of a video stream or at least a portion thereof into a filtered reconstructed picture.

More specifically, the filter apparatus 120 (or "loop filter" 120) is configured to filter the reconstructed block 115 to obtain a filtered block 121. In addition to the filtering provided by the filter apparatus 120, 220, which is in particular for noise suppression, such as blocking artefacts, and will be described in more detail below, the filter apparatus 120 can further comprise a de-blocking sample-adaptive offset (SAO) filter or other filters, e.g., sharpening filters. The filtered block 121 may also be referred to as filtered reconstructed block 121.

Embodiments of the filter apparatus 120 may comprise (not shown in FIG. 1) a filter analysis unit and the actual filter unit, wherein the filter analysis unit is configured to determine filter parameters for the actual filter. The filter analysis unit may be configured to apply fixed pre-determined filter parameters to the actual filter, adaptively select filter parameters from a set of predetermined filter parameters or adaptively calculate filter parameters for the actual filter.

Embodiments of the filter apparatus 120 may comprise (not shown in FIG. 1) one or a plurality of sub-filters, e.g., one or more of different kinds or types of filters, e.g., connected in series or in parallel or in any combination thereof, wherein each of the sub-filters may comprise individually or jointly with other sub-filters of the plurality of sub-filters a filter analysis unit to determine the respective filter parameters, e.g., as described in the previous paragraph.

Embodiments of the encoder 100 (respectively filter apparatus 120) may be configured to output the filter parameters, e.g., directly or entropy encoded via the entropy encoding unit 170 or any other entropy coding unit, so that, e.g., the decoder 200 may receive and apply the same filter parameters for decoding.

The decoded picture buffer (DPB) 130 of the encoder 100 is configured to receive and store the filtered block 121. The decoded picture buffer 130 may be further configured to store other previously filtered blocks, e.g., previously reconstructed and filtered blocks 121, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the invention may also be configured to use the previously filtered blocks and corresponding filtered sample values of the decoded picture buffer 130 for any kind of estimation or prediction, e.g., intra and inter estimation and prediction.

The prediction unit 160, also referred to as block prediction unit 160, of the encoder 100 is configured to receive or obtain the picture block 103 (current picture block 103 of the current picture 101) and decoded or at least reconstructed picture data, e.g., reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

The mode selection unit 162 of the encoder 100 may be configured to select a prediction mode (e.g., an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g., from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g., prediction unit 160 and mode selection (e.g., by mode selection unit 162) performed by the encoder 100 according to an embodiment will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g., non-directional modes like DC (or mean) mode and planar mode, or directional modes, e.g., as defined in H.264, or may comprise 65 different intra-prediction modes, e.g., non-directional modes like DC (or mean) mode and planar mode, or directional modes, e.g., as defined in H.265.

The set of (or possible) inter-prediction modes depends on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The prediction unit 160 of the encoder 100 may be further configured to partition the block 103 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g., reconstructed blocks of one or a plurality of other/different previously decoded pictures 231, for inter estimation (or "inter picture estimation"). For instance, a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture and/or an offset between the position of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 of the encoder is configured to obtain, e.g., receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one, e.g., by testing all possible or a predetermined subset of possible inter prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g., receive, the picture block 103 (current picture block) and one or a plurality of previously reconstructed blocks, e.g., reconstructed neighbor blocks, of the same picture for intra estimation. The encoder 100 may, e.g., be configured to select an intra prediction mode from a plurality of (predetermined) intra prediction modes and provide it as intra estimation parameter 153 to the intra prediction unit 154.

Although FIG. 1 shows two distinct units (or steps) for the intra-coding, namely intra estimation 152 and intra prediction 154, both functionalities may be performed as one, e.g., by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 of the encoder 100 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g., in the form of an encoded bitstream 171.

FIG. 2 shows an exemplary video decoder 200 configured to receive encoded picture data (e.g., encoded bitstream) 171, e.g., encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, the filter apparatus 220 according to an embodiment, a decoded picture buffer 230, a prediction unit 260, including an inter prediction unit 244 and an intra prediction unit 254, a mode selection unit 260 and an output 232.

The entropy decoding unit 204 of the decoder 200 is configured to perform entropy decoding to the encoded picture data 171 to obtain, e.g., quantized coefficients 209 and/or decoded coding parameters (not shown in FIG. 2), e.g., any or all of inter prediction parameters 143, intra prediction parameter 153, and/or filter parameters.

In embodiments of the decoder 200, the inverse quantization unit 210, the inverse transformation unit 212, the reconstruction unit 214, the buffer 216, the filter apparatus 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the filter apparatus 220 according to an embodiment may be identical in function to the encoder filter apparatus 120 according to an embodiment (with regard to the actual loop filter as the filter apparatus 220 typically does not comprise a filter analysis unit to determine the filter parameters based on the original image 101 or block 103 but receives (explicitly or implicitly) or obtains the filter parameters used for encoding, e.g., from entropy decoding unit 204), and the decoded picture buffer 230 may be identical in function to the decoded picture buffer 130.

The prediction unit 260 of the decoder 200 may comprise an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g., from the entropy decoding unit 204.

The decoder 200 is configured to output the decoded picture 230, e.g., via output 232, for presentation or viewing to a user.

As already described above, embodiments of the invention relate to the filter apparatus 120 of the encoder 100 and/or to the filter apparatus 220 of the decoder 200, in particular for noise suppression. As already described above, the filter apparatus 120 of the encoder 100 and the filter apparatus 220 of the decoder 200 may contain further sub-filters to the ones described in the following.

Figure 5:
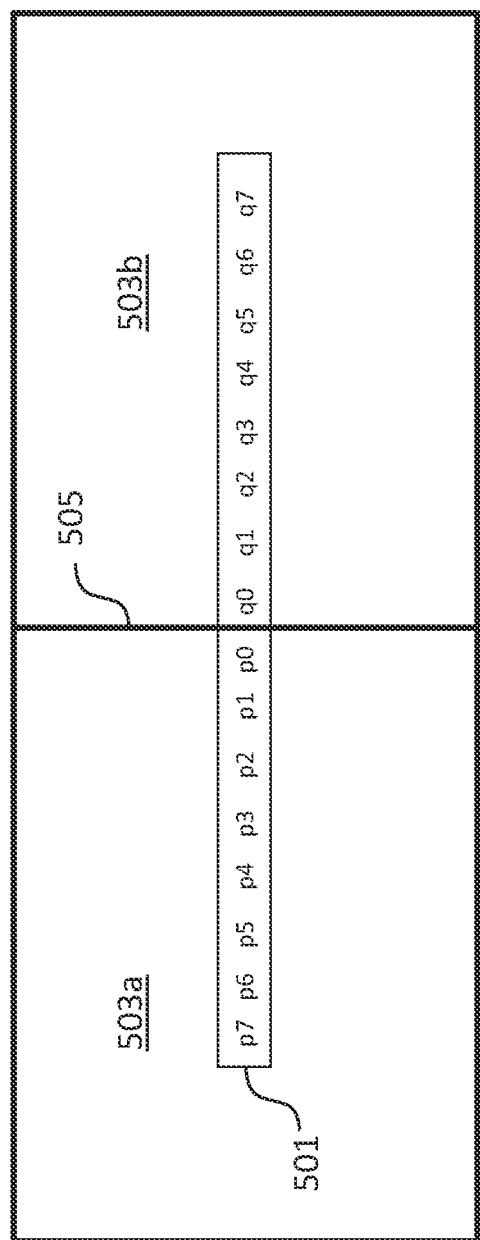
FIG. 5 is a diagram showing the samples of two horizontally neighboring sample blocks used by a filter apparatus according to an embodiment.

FIG. 5 illustrates a current row of samples 501 from two horizontally neighboring sample blocks 503a, 503b of a reconstructed picture of a video stream. The first sample block 503a and the horizontally neighboring sample block 503b are separated by a vertically extending edge or boundary 505. As can be taken from FIG. 5, the samples having the sample values $q_i$ with i from 0 to N−1 (in the exemplary embodiment shown in FIG. 5 N is equal to 8; generally N should be an even integer larger than 2) are from the first sample block 503a (therefore, also referred to as block Q) and the samples having the values $p_i$ with i from 0 to N−1 are from the horizontally neighboring second sample block 503b (therefore, also referred to as block P). By way of example, the first sample block 503a and the second sample block 503b have the same size. In different embodiment, the sizes of the first sample block 503a and the second sample block 503b can be different. As will be appreciated, for the case of two vertically neighboring sample blocks the current row of samples 501 turns into a current column of samples and the vertically extending edge 505 between the blocks turns into a horizontally extending edge.

Figure 4:
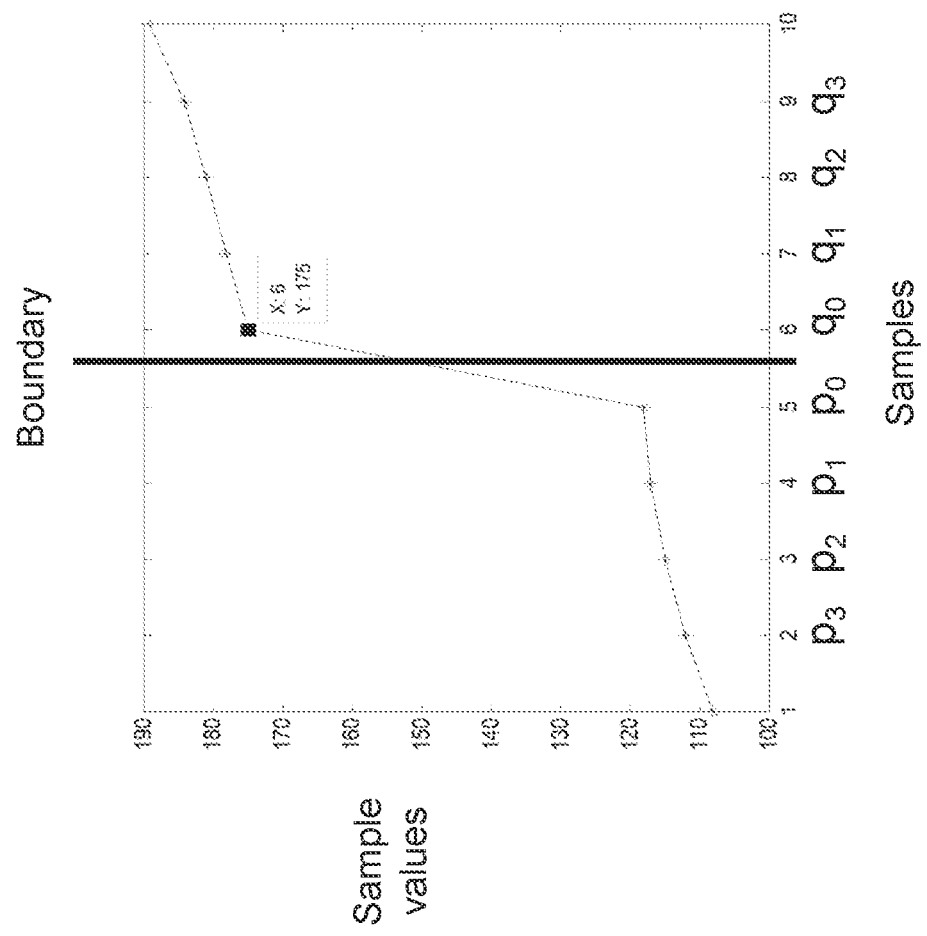
FIG. 4 is a diagram showing an example of a discontinuity of sample values at the edge between two neighboring sample blocks.

As will be described in more detail below, the filter apparatus 120, 220 is configured to process the current row (or column) 501 of samples into a filtered row (or column) of samples. To this end, the filter apparatus 120, 220 comprises processing circuitry configured to check whether a first condition defined by the following equation is satisfied:

$$((|p_{N-1}-2\cdot p_{N/2}+p_1|+|q_{N-1}-2\cdot q_{N/2}+q_1|)<<1)<\beta/k \quad (2),$$

or for the exemplary case of N=8 shown in FIG. 5:

$$((|p_7-2\cdot p_4+p_1|+|q_7-2\cdot q_4+q_1|)<<1)<\beta/k, \quad (2)$$

wherein β denotes the threshold parameter known, for instance, from the HEVC standard and "<<" denotes the left shift operation and k is a positive integer. Advantageously, the filter condition defined by equation (2) uses the second derivative of a wider range of samples on both sides of the edge 505. Since the sample values $p_4$ and $q_4$ of intermediate samples of the current row of samples 501 are considered, the filter condition defined by equation (2) can detect edges as illustrated in FIG. 4, as the value $p_4$ (or $q_4$) of the intermediate can counter balance the sum of the sample values $p_1$ and $p_7$ (or $q_1$ and $q_7$). Moreover, it is noted that in the condition defined by equation (2) the samples values $p_1$ and $q_1$ are used instead of the conventional $p_0$ and $q_0$, because it has been discovered that for longer tap filters the inner most sample might not be a good candidate for the filtering decision. In addition to detecting edges having a distribution of sample values with the shape of an inclined ramp, the condition defined in equation (2) can also be applied for flat edges. Therefore, one major advantage of the filter condition defined by equation (2) is that edges can be filtered when the signal on both sides of the boundary 505 are either flat or have the shape of a ramp.

Alternatively, the processing circuitry is configured to check whether a second condition defined by the following equation is satisfied:

$$\left(\left(\sum_{i=1}^{N-2}|SDpi+SDqi|\right)\ll 1\right)<(N-2)\cdot\frac{\beta}{k}, \quad (3)$$

or for the exemplary case of N=8 shown in FIG. 5:

$$\left(\left(\sum_{i=1}^{6}|SDpi+SDqi|\right)\ll 1\right)<6\cdot\frac{\beta}{k}, \quad (3)$$

wherein $SDp_i=|p_{i-1}-2\cdot p_i+p_{i+1}|$ and $SDq_i=|q_{i-1}-2\cdot q_i+q_{i+1}|$ for $i\in[1, 2, \ldots, N-2]$ (i.e. $i\in[1, 2, 3, 4, 5, 6]$ for the case N=8). The filter condition defined by equation (3) allows for a more accurate detection than the filter condition defined by equation (2) at the expense of an increased computational complexity. The extended filter condition defined by equation (3) checks the second derivative of every sample on each side of the edge 505 except for the innermost and the outermost two samples, i.e. $p_0$, $q_0$ and $p_{N-1}$.

For both filter conditions the value of the threshold parameter β depends on the quantization parameter, QP. As already described above, the QP is a well-known parameter in video coding standards that controls the trade-off between bitrate and video content quality. In an embodiment, the QP can range from 0 to 51. In an embodiment the processing circuitry of the filter apparatus 120, 220 is configured to determine the threshold parameter β on the basis of the quantization parameter, QP, using a look-up table. In an embodiment, the look-up table can be defined as follows: Look-up Table[52]={0,0,0,0,0,0,0,0,0,0,0,0,0,0,0,6,7,8,9, 10,11,12,13,14,15,16,17,18,20,22,24,26,28,30,32,34,36,3 8,40,42,44,46,48,50,52,54,56,58,60,62,64}.

For more details about the threshold parameter β and its dependency on the QP reference is made to chapter 7 of the book "High Efficiency Video Coding (HEVC)", Sze et al, which is herein fully incorporated by reference.

Figure 7:
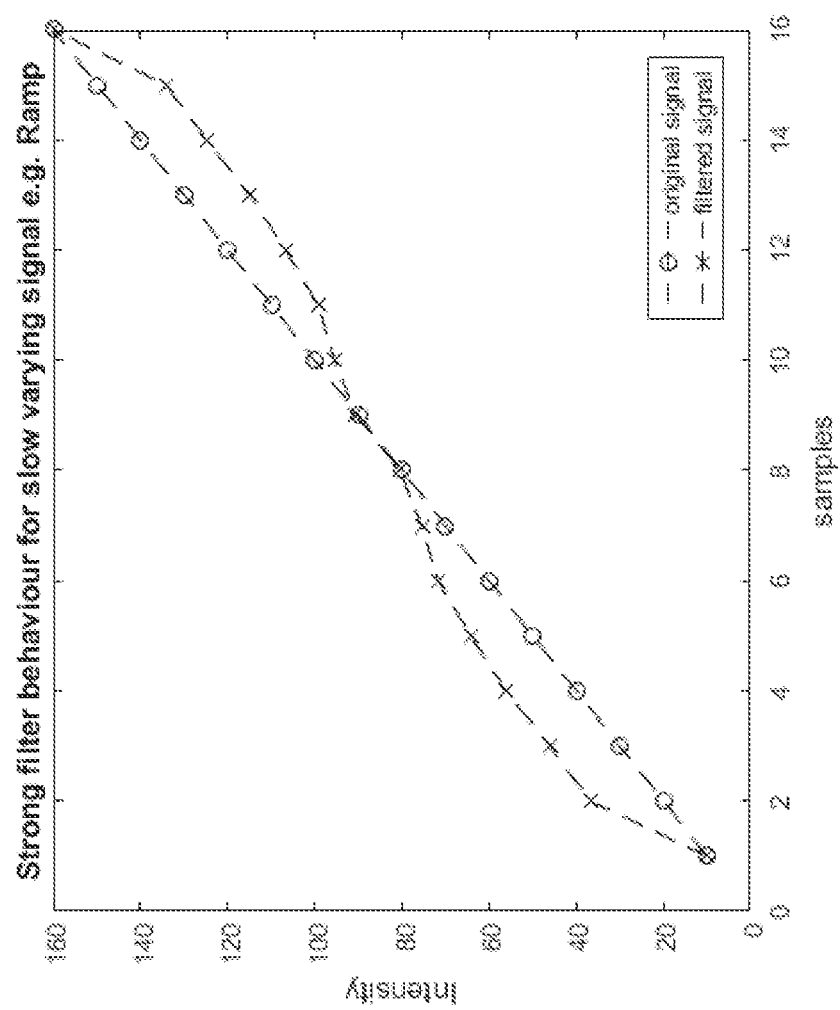
FIG. 7 is a diagram illustrating a filtering operation.

In certain cases the filter condition defined in equations (2) and/or (3), when used in combination with the filter coefficients disclosed in JVET-J0024, can lead to an undesired side effect, which is illustrated in FIG. 7. In the original signal the distribution of sample values has the shape of a ramp, whereas filtering using the filter coefficients defined in JVET-J0024 create an undesired distortion. Depending on their position, the filtered samples are different from the original ones, and the distortion is high particularly in the middle of each side. In order to reduce the distortion in such cases, the processing circuitry of the filter apparatus 120, 220, if the first condition defined by equation (2) is satisfied or the second condition defined by equation (3) is satisfied, will process the current row (or column) 501 of samples into a filtered row (or column) of samples using different filter coefficients. To this end, the processing circuitry is configured to determine a filtered sample value $q_0'$ of the first sample of the current row or column of samples to the right or bottom of a vertical or horizontal edge 505 between the first and the second sample block 503a, 503b by applying a (2N−1)-tap filter having 2N−1 filter coefficients to the sample values of the current row or column 501 of samples, wherein the filter coefficient for the sample value $q_0$ of the first sample of the current row or column of samples to the right or bottom of the vertical or horizontal edge 505 is equal to 2, wherein the filter coefficient for the sample value $p_{N-1}$ of the farthest sample of the current row or column of samples to the left or top of the vertical or horizontal edge 505 is equal to 0, and the filter coefficients for the other sample values are equal to 1.

Likewise the processing circuitry of the filter apparatus 120, 220 is configured to determine a filtered sample value $p_0'$ of the first sample of the current row or column of samples to the left or top of the vertical or horizontal edge 505 between the first and the second sample block 503a, 503b by applying a (2N−1)-tap filter having 2N−1 filter coefficients to the sample values of the current row or column 501 of samples, wherein the filter coefficient for the sample value $p_0$ of the first sample of the current row or column of samples to the left or top of the vertical or horizontal edge 505 is equal to 2, wherein the filter coefficient for the sample value $q_{N-1}$ of the farthest sample of the current row or column of samples to the right or bottom of the vertical or horizontal edge 505 is equal to 0, and the filter coefficients for the other sample values are equal to 1.

In an embodiment, the processing circuitry is further configured to, if the first condition or the second condition is satisfied, process the current row or column 501 of samples into the filtered row or column of samples by determining a filtered sample value $q_1'$ of the second sample of the current row or column 501 of samples to the right or bottom of the vertical or horizontal edge 505 between the first and the second sample block 503a, 503b by applying a (2N−2)-tap filter having 2N−2 filter coefficients to the sample values of the current row or column 501 of samples, wherein the filter coefficient for the sample value $q_0$ of the first sample of the current row or column of samples to the right or bottom of the vertical or horizontal edge 505 is equal to 3, wherein the filter coefficients for the sample values $p_{N-1}$ and $p_{N-2}$ of the farthest samples of the current row or column of samples to the left or top of the vertical or horizontal edge 505 are equal to 0, and the filter coefficients for the other sample values are equal to 1.

Likewise, in an embodiment, the processing circuitry of the filter apparatus 120, 220 is further configured to, if the first condition or the second condition is satisfied, process the current row or column 501 of samples into the filtered row or column of samples by determining a filtered sample value $p_1'$ of the second sample of the current row or column 501 of samples to the left or top of the vertical or horizontal edge 505 between the first and the second sample block 503a, 503b by applying a (2N−2)-tap filter having 2N−2 filter coefficients to the sample values of the current row or column 501 of samples, wherein the filter coefficient for the sample value $p_0$ of the first sample of the current row or column of samples to the left or top of the vertical or horizontal edge 505 is equal to 3, wherein the filter coefficients for the sample values $q_{N-1}$ and $q_{N-2}$ of the farthest samples of the current row or column of samples to the right or bottom of the vertical or horizontal edge 505 are equal to 0, and the filter coefficients for the other sample values are equal to 1.

In an embodiment, the processing circuitry is configured to, if the first condition or the second condition is satisfied, process the current row or column 501 of samples into the filtered row or column of samples, by determining the filtered sample values $p_{N-2}'$, $p_{N-3}'$, ..., $p_2'$ on the basis of a padded version of the (2N−2)-tap filter used for determining the filtered sample value $p_1'$ and/or the filtered sample values $q_{N-2}'$, $q_{N-3}'$, ..., $q_2'$ on the basis of a padded version of the (2N−2)-tap filter used for determining the filtered sample value $q_1'$, which will be described in more detail in the following on the basis of an exemplary embodiment, wherein N=8.

In an embodiment, the processing circuitry of the filter apparatus 120, 220 is further configured to determine (iii) whether a third condition is satisfied that the width or the height of the first sample block 503a and of the horizontally or vertically neighboring second sample block 503b is larger than N samples and, process the current row (or column) 501 of samples into the filtered row or column of samples, only if the first condition and the third condition or the second condition and the third condition are satisfied.

For the case N=8, the processing circuitry of the filter apparatus 120, 220 is configured to determine the filtered sample value $q_0'$ of the first sample of the current row (or column) 501 of samples to the right (or bottom) of the vertically (or horizontally) extending edge 505 on the basis of the following equation:

$$q_0'=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+ \\ 1 \cdot q_1+1 \cdot q_2+1 \cdot q_3+1 \cdot q_4+1 \cdot q_5+1 \cdot q_6+1 \cdot q_7+8)/16.$$

Likewise, for the case N=8, the processing circuitry of the filter apparatus 120, 220 is configured to determine the filtered sample value $p_0'$ of the first sample of the current row (or column) 501 of samples to the left (or top) of the vertically (or horizontally) extending edge 505 on the basis of the following equation:

$$p_0'=(1 \cdot p_7+1 \cdot p_6+1 \cdot p_5+1 \cdot p_4+1 \cdot p_3+1 \cdot p_2+1 \cdot p_1+2 \cdot p_0+1 \cdot q_0+ \\ 1 \cdot q_1+1 \cdot q_2+1 \cdot q_3+1 \cdot q_4+1 \cdot q_5+1 \cdot q_6+0 \cdot q_7+8)/16.$$

In further embodiments for the case N=8, the processing circuitry of the filter apparatus 120, 220 is configured to, if the first condition or the second condition is satisfied, process the current row (or column) 501 of samples into the filtered row or column of samples by determining a filtered sample value $q_i'$ with i=1, ..., 6 of the second to seventh sample of the current row (or column) 501 of samples to the right (or bottom) of the vertically (or horizontally) extending edge 505 between the first and the second sample block 503a, 503b on the basis of one or more of the following equations:

$$q_1'=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+ \\ 3 \cdot q_1+1 \cdot q_2+1 \cdot q_3+1 \cdot q_4+1 \cdot q_5+1 \cdot q_6+1 \cdot q_7+8)/16; \text{ and/or}$$

$$q_2'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+ \\ 1 \cdot q_1+3 \cdot q_2+1 \cdot q_3+1 \cdot q_4+1 \cdot q_5+1 \cdot q_6+2 \cdot q_7+8)/16; \text{ and/or}$$

$$q_3'=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+ \\ 1 \cdot q_1+1 \cdot q_2+3 \cdot q_3+1 \cdot q_4+1 \cdot q_5+1 \cdot q_6+3 \cdot q_7+8)/16; \text{ and/or}$$

$$q_4'=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+ \\ 1 \cdot q_1+1 \cdot q_2+1 \cdot q_3+3 \cdot q_4+1 \cdot q_5+1 \cdot q_6+4 \cdot q_7+8)/16; \text{ and/or}$$

$$q_5'=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+ \\ 1 \cdot q_1+1 \cdot q_2+1 \cdot q_3+1 \cdot q_4+3 \cdot q_5+1 \cdot q_6+5 \cdot q_7+8)/16; \text{ and/or}$$

$$q_6'=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+ \\ 1 \cdot q_1+1 \cdot q_2+1 \cdot q_3+1 \cdot q_4+1 \cdot q_5+3 \cdot q_6+6 \cdot q_7+8)/16.$$

Likewise, the processing circuitry of the filter apparatus 120, 220 in further embodiments for the case N=8 is configured to, if the first condition or the second condition is satisfied, process the current row (or column) 501 of samples into the filtered row or column of samples by determining a filtered sample value $p_i'$ with i=1, ..., 6 of the second to seventh sample of the current row (or column) 501 of samples to the left (or top) of the vertically (or horizontally) extending edge 505 between the first and the second sample block 503a, 503b on the basis of one or more of the following equations:

$$p_1'=(1 \cdot p_7+1 \cdot p_6+1 \cdot p_5+1 \cdot p_4+1 \cdot p_3+1 \cdot p_2+3 \cdot p_1+1 \cdot p_0+1 \cdot q_0+ \\ 1 \cdot q_1+1 \cdot q_2+1 \cdot q_3+1 \cdot q_4+1 \cdot q_5+0 \cdot q_6+0 \cdot q_7+8)/16; \text{ and/or}$$

$$p_2'=(2 \cdot p_7+1 \cdot p_6+1 \cdot p_5+1 \cdot p_4+1 \cdot p_3+3 \cdot p_2+1 \cdot p_1+1 \cdot p_0+1 \cdot q_0+ \\ 1 \cdot q_1+1 \cdot q_2+1 \cdot q_3+1 \cdot q_4+0 \cdot q_5+0 \cdot q_6+0 \cdot q_7+8)/16; \text{ and/or}$$

$$p_3'=(3 \cdot p_7+1 \cdot p_6+1 \cdot p_5+1 \cdot p_4+3 \cdot p_3+1 \cdot p_2+1 \cdot p_1+1 \cdot p_0+1 \cdot q_0+ \\ 1 \cdot q_1+1 \cdot q_2+1 \cdot q_3+0 \cdot q_4+0 \cdot q_5+0 \cdot q_6+0 \cdot q_7+8)/16; \text{ and/or}$$

$$p_4'=(4 \cdot p_7+1 \cdot p_6+1 \cdot p_5+3 \cdot p_4+1 \cdot p_3+1 \cdot p_2+1 \cdot p_1+1 \cdot p_0+1 \cdot q_0+ \\ 1 \cdot q_1+1 \cdot q_2+0 \cdot q_3+0 \cdot q_4+0 \cdot q_5+0 \cdot q_6+0 \cdot q_7+8)/16; \text{ and/or}$$

$$p_5'=(5 \cdot p_7+1 \cdot p_6+3 \cdot p_5+1 \cdot p_4+1 \cdot p_3+1 \cdot p_2+1 \cdot p_1+1 \cdot p_0+1 \cdot q_0+ \\ 1 \cdot q_1+0 \cdot q_2+0 \cdot q_3+0 \cdot q_4+0 \cdot q_5+0 \cdot q_6+0 \cdot q_7+8)/16; \text{ and/or}$$

$$p_6'=(6 \cdot p_7+3 \cdot p_6+1 \cdot p_5+1 \cdot p_4+1 \cdot p_3+1 \cdot p_2+1 \cdot p_1+1 \cdot p_0+1 \cdot q_0+ \\ 0 \cdot q_1+0 \cdot q_2+0 \cdot q_3+0 \cdot q_4+0 \cdot q_5+0 \cdot q_6+0 \cdot q_7+8)/16.$$

Figure 8:
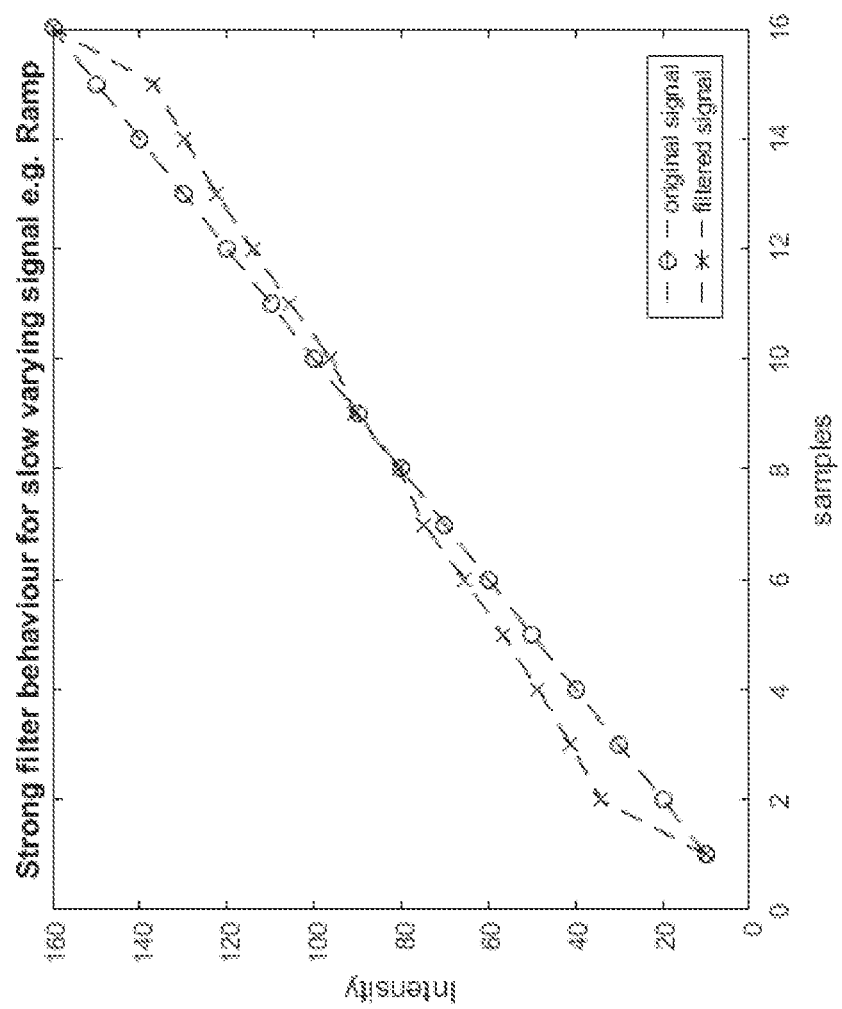
FIG. 8 is a diagram illustrating the performance of a filter apparatus according to an embodiment.

The corresponding filter coefficient matrix of the filters described above is illustrated in FIG. 6. As can be taken from FIG. 8, the distortion observed in the case of FIG. 7 can be reduced, if the above filter coefficients are used in combination with the filter condition defined by equation (2) or the filter condition defined by equation (3).

In further alternative embodiments for the case N=8, the processing circuitry of the filter apparatus 120, 220 is configured to, if the first condition or the second condition is satisfied, process the current row (or column) 501 of samples into the filtered row or column of samples by determining a filtered sample value $q_i'$ with i=1, ..., 6 of the second to seventh sample of the current row (or column) 501 of samples to the right (or bottom) of the vertically (or horizontally) extending edge 505 between the first and the second sample block 503a, 503b on the basis of one or more of the following equations:

$$q_1'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+ \\ 4 \cdot q_1+1 \cdot q_2+1 \cdot q_3+1 \cdot q_4+1 \cdot q_5+1 \cdot q_6+1 \cdot q_7+8)/16; \text{ and/or}$$

$$q_2'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+ \\ 1 \cdot q_1+4 \cdot q_2+1 \cdot q_3+1 \cdot q_4+1 \cdot q_5+1 \cdot q_6+2 \cdot q_7+8)/16; \text{ and/or}$$

$$q_3'=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+ \\ 1 \cdot q_1+1 \cdot q_2+1 \cdot q_3+1 \cdot q_4+1 \cdot q_5+1 \cdot q_6+3 \cdot q_7+8)/16; \text{ and/or}$$

$$q_4'=(0\cdot p_7+0\cdot p_6+0\cdot p_5+0\cdot p_4+0\cdot p_3+1\cdot p_2+1\cdot p_1+1\cdot p_0+1\cdot q_0+1\cdot q_1+1\cdot q_2+1\cdot q_3+4\cdot q_4+1\cdot q_5+1\cdot q_6+4\cdot q_7+8)/16; \text{ and/or}$$

$$q_5'=(0\cdot p_7+0\cdot p_6+0\cdot p_5+0\cdot p_4+0\cdot p_3+0\cdot p_2+1\cdot p_1+1\cdot p_0+1\cdot q_0+1\cdot q_1+1\cdot q_2+1\cdot q_3+1\cdot q_4+4\cdot q_5+1\cdot q_6+5\cdot q_7+8)/16; \text{ and/or}$$

$$q_6'=(0\cdot p_7+0\cdot p_6+0\cdot p_5+0\cdot p_4+0\cdot p_3+0\cdot p_2+0\cdot p_1+1\cdot p_0+1\cdot q_0+1\cdot q_1+1\cdot q_2+1\cdot q_3+1\cdot q_4+1\cdot q_5+4\cdot q_6+6\cdot q_7+8)/16.$$

Likewise, the processing circuitry of the filter apparatus 120, 220 in further alternative embodiments for the case N=8 is configured to, if the first condition or the second condition is satisfied, process the current row (or column) 501 of samples into the filtered row or column of samples by determining a filtered sample value $p_i'$ with i=1, . . . , 6 of the second to seventh sample of the current row (or column) 501 of samples to the left (or top) of the vertically (or horizontally) extending edge 505 between the first and the second sample block 503a, 503b on the basis of one or more of the following equations:

$$p_1'=(1\cdot p_7+1\cdot p_6+1\cdot p_5+1\cdot p_4+1\cdot p_3+1\cdot p_2+4\cdot p_1+1\cdot p_0+1\cdot q_0+1\cdot q_1+1\cdot q_2+1\cdot q_3+1\cdot q_4+1\cdot q_5+0\cdot q_6+0\cdot q_7+8)/16.$$

$$p_2'=(2\cdot p_7+1\cdot p_6+1\cdot p_5+1\cdot p_4+1\cdot p_3+4\cdot p_2+1\cdot p_1+1\cdot p_0+1\cdot q_0+1\cdot q_1+1\cdot q_2+1\cdot q_3+1\cdot q_4+0\cdot q_5+0\cdot q_6+0\cdot q_7+8)/16.$$

$$p_3'=(3\cdot p_7+1\cdot p_6+1\cdot p_5+1\cdot p_4+4\cdot p_3+1\cdot p_2+1\cdot p_1+1\cdot p_0+1\cdot q_0+1\cdot q_1+1\cdot q_2+1\cdot q_3+0\cdot q_4+0\cdot q_5+0\cdot q_6+0\cdot q_7+8)/16.$$

$$p_4'=(4\cdot p_7+1\cdot p_6+1\cdot p_5+4\cdot p_4+1\cdot p_3+1\cdot p_2+1\cdot p_1+1\cdot p_0+1\cdot q_0+1\cdot q_1+1\cdot q_2+0\cdot q_3+0\cdot q_4+0\cdot q_5+0\cdot q_6+0\cdot q_7+8)/16.$$

$$p_5'=(5\cdot p_7+1\cdot p_6+4\cdot p_5+1\cdot p_4+1\cdot p_3+1\cdot p_2+1\cdot p_1+1\cdot p_0+1\cdot q_0+1\cdot q_1+0\cdot q_2+0\cdot q_3+0\cdot q_4+0\cdot q_5+0\cdot q_6+0\cdot q_7+8)/16.$$

$$p_6'=(6\cdot p_7+4\cdot p_6+1\cdot p_5+1\cdot p_4+1\cdot p_3+1\cdot p_2+1\cdot p_1+1\cdot p_0+1\cdot q_0+0\cdot q_1+0\cdot q_2+0\cdot q_3+0\cdot q_4+0\cdot q_5+0\cdot q_6+0\cdot q_7+8)/16.$$

Figure 6:
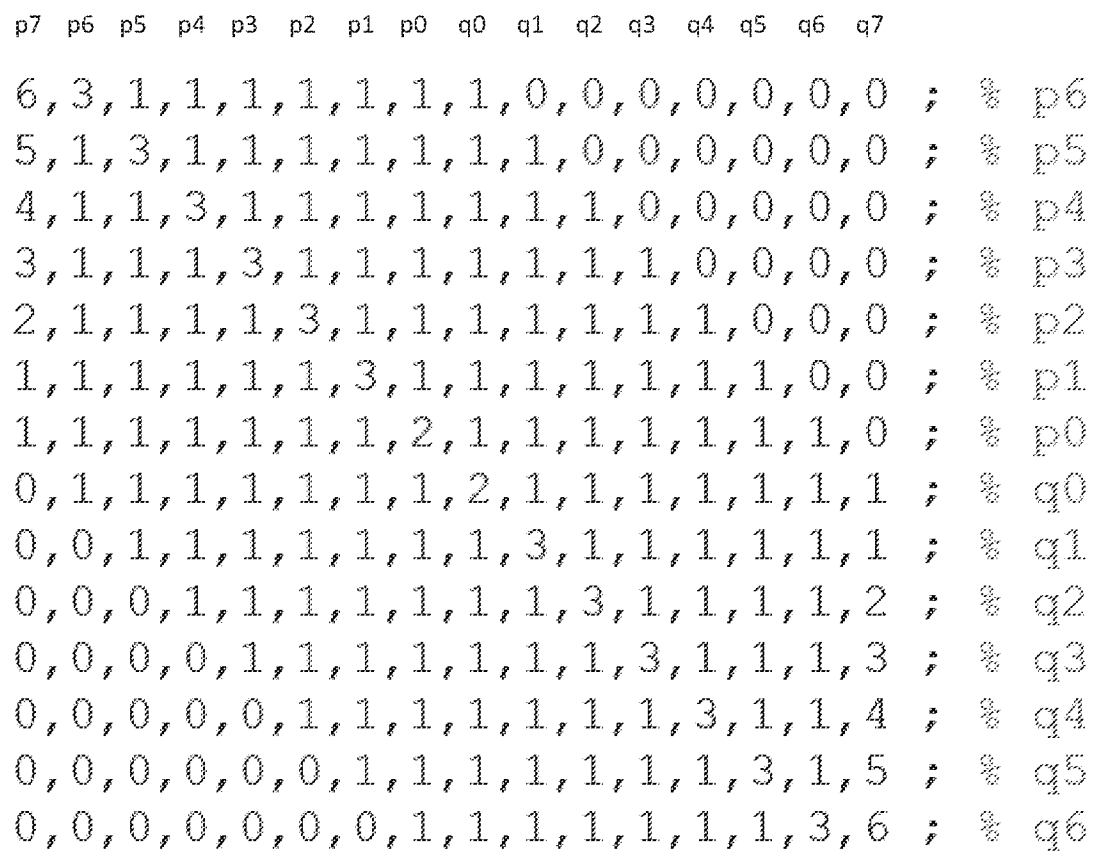

As will be appreciated, the filter coefficient matrix of the filters according to the above alternative embodiments can be easily deduced from the filter coefficient matrix shown in FIG. 6 by simply replacing the factor 3 with the factor 4 along one of the main diagonals thereof. One advantage of the filters according to the above alternative embodiments is that the multiplication operation with the factor 4 is easier than with the factor 3 (which requires a summation operation), and additionally it is more symmetric. On the other hand the filters defined above have more low-pass response (with higher ratio of smoothing).

In an embodiment for the case N=8, the processing circuitry of the filter apparatus 120, 220 does not filter the sample value of the eighth sample of the current row (or column) 501 of samples to the right and/or the left (or bottom and/or top) of the vertically (or horizontally) extending edge 505 between the first and the second sample block 503a, 503b, i.e. $q_7'=q_7$; and/or $p_7'=p_7$.

Figure 9:
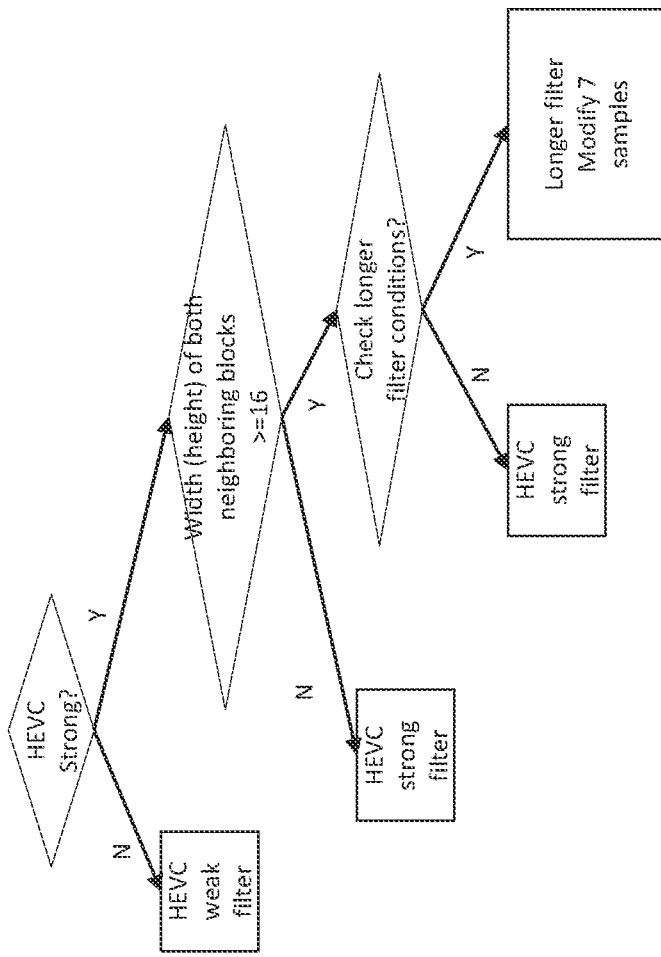
FIG. 9 is a flow chart illustrating a method for determining whether a longer tap filter shall be used.

As illustrated in FIG. 9, the HEVC strong filter condition should be satisfied for the "longer tap filter" conditions to be true.

Although embodiments of the invention have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g., partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

Embodiments of the invention may further comprise an apparatus, e.g., encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g., a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the invention comprises or is a computer program comprising program code for performing any of the methods described herein, when executed on a computer.

An embodiment of the invention comprises or is a computer readable medium comprising a program code that, when executed by a processor, causes a computer system to perform any of the methods described herein.

The invention claimed is:

1. An in-loop deblocking filter apparatus (120, 220) for processing a current row or column (501) of samples into a filtered row or column of samples, wherein the current row or column (501) of samples comprises a plurality of samples from a first sample block (503a) and a horizontally or vertically neighboring second sample block (503b) of a reconstructed picture of a video stream and wherein each sample of the current row or column (501) of samples has a sample value $p_{N-1}$–$p_0$, $q_0$–$q_{N-1}$ with N being an even integer larger than 2, wherein the filter apparatus (120, 220) comprises processing circuitry configured to:

determine (i) whether a first condition defined by the following equation is satisfied:

$$((|p_{N-1} - 2 \cdot p_{N/2} + p_1| + |q_{N-1} - 2 \cdot q_{N/2} + q_1|) \ll 1) < \frac{\beta}{k}$$

wherein β denotes a threshold parameter, k is a positive integer and the symbol "<<" denotes the left shift operation, or (ii) whether a second condition defined by the following equation is satisfied:

$$\left(\left(\sum_{i=1}^{N-2} |SDpi + SDqi|\right) \ll 1\right) < (N-2) \cdot \frac{\beta}{k}$$

wherein $SDp_i=|p_{i-1}-2\cdot p_i+p_{i+1}|$, $SDq_i=|q_{i-1}-2\cdot q_i+q_{i+1}|$ for $i\in[1, 2, \ldots, N-2]$ and β denotes a threshold parameter and k is a positive integer; and if the first condition or the second condition is satisfied, process the current row or column (501) of samples into the filtered row or column of samples by determining a filtered sample value $q_0'$ of the first sample of the current row or column of samples to the right or bottom of a vertical or horizontal edge (505) between the first and the second sample block (503a, 503b) by applying a (2N−1)-tap filter having 2N−1 filter coefficients to the sample values of the current row or column (501) of samples, wherein the filter coefficient for the sample value $q_0$ of the first sample of the current row or column of samples to the right or bottom of the vertical or horizontal edge (505) is equal to 2, wherein the filter coefficient for the sample value $p_{N-1}$ of the farthest sample of the current row or column of samples to the left or top of the vertical or horizontal edge (505) is equal to 0, and the filter coefficients for the other sample values are equal to 1; and/or by determining a filtered sample value $p_0'$ of the first sample of the current row or column of samples to the left or top of a vertical or horizontal edge (505) between the first and the second sample block (503a, 503b) by applying a (2N−1)-tap filter having 2N−1 filter coefficients to the sample values of the current row or column (501) of samples, wherein the filter coefficient for the sample value $p_0$ of the first sample of the current row or column of samples to the left or top of the vertical or horizontal edge (505) is equal to 2, wherein the filter coefficient for the sample value $q_{N-1}$ of the farthest sample of the current row or column of samples to the right or bottom of the vertical or horizontal edge (505) is equal to 0, and the filter coefficients for the other sample values are equal to 1.

2. The filter apparatus (120, 220) of claim 1, wherein the processing circuitry is configured to, if the first condition or the second condition is satisfied, process the current row or column (501) of samples into the filtered row or column of samples by determining a filtered sample value $q_1'$ of the second sample of the current row or column (501) of samples to the right or bottom of the vertical or horizontal edge (505) between the first and the second sample block (503a, 503b) by applying a (2N−2)-tap filter having 2N−2 filter coefficients to the sample values of the current row or column (501) of samples, wherein the filter coefficient for the sample value $q_0$ of the first sample of the current row or column of samples to the right or bottom of the vertical or horizontal edge (505) is equal to 3, wherein the filter coefficients for the sample values $p_{N-1}$ and $p_{N-2}$ of the farthest samples of the current row or column of samples to the left or top of the vertical or horizontal edge (505) are equal to 0, and the filter coefficients for the other sample values are equal to 1; and/or by determining a filtered sample value $p_1'$ of the second sample of the current row or column (501) of samples to the left or top of the vertical or horizontal edge (505) between the first and the second sample block (503a, 503b) by applying a (2N−2)-tap filter having 2N−2 filter coefficients to the sample values of the current row or column (501) of samples, wherein the filter coefficient for the sample value $p_0$ of the first sample of the current row or column of samples to the left or top of the vertical or horizontal edge (505) is equal to 3, wherein the filter coefficients for the sample values $q_{N-1}$ and $q_{N-2}$ of the farthest samples of the current row or column of samples to the right or bottom of the vertical or horizontal edge (505) are equal to 0, and the filter coefficients for the other sample values are equal to 1.

3. The filter apparatus (120, 220) of claim 2, wherein the processing circuitry is configured to, if the first condition or the second condition is satisfied, process the current row or column (501) of samples into the filtered row or column of samples, by determining the filtered sample values $p_{N-2}'$, $p_{N-3}'$, ..., $p_2'$ on the basis of a padded version of the (2N−2)-tap filter used for determining the filtered sample value $p_1'$ and/or the filtered sample values $q_{N-2}'$, $q_{N-3}'$, ..., $q_2'$ on the basis of a padded version of the (2N−2)-tap filter used for determining the filtered sample value $q_1'$.

4. The filter apparatus (120, 220) of claim 1, wherein the processing circuitry is further configured to determine the threshold parameter β on the basis of a quantization parameter, QP, associated with a quantization step size of the plurality of samples.

5. The filter apparatus (120, 220) of claim 4, wherein the processing circuitry is further configured to determine the threshold parameter β on the basis of the quantization parameter, QP, using a look-up table.

6. The filter apparatus (120, 220) of claim 1, wherein the processing circuitry is further configured to determine (iii) whether a third condition is satisfied that the width or the height of the first sample block (503a) and the horizontally or vertically neighboring second sample block (503b) is larger than N samples and, process the current row or column (501) of samples into the filtered row or column of samples, if the first condition and the third condition or the second condition and the third condition are satisfied.

7. The filter apparatus (120, 220) of claim 1, wherein N is equal to 8 and wherein the processing circuitry is configured to:
determine (i) whether the first condition defined by the following equation is satisfied:

$$((|p_7 - 2 \cdot p_4 + p_1| + |q_7 - 2 \cdot q_4 + q_1|) \ll 1) < \frac{\beta}{k},$$

or
(ii) whether the second condition defined by the following equation is satisfied:

$$\left(\sum |SDp_i + SDq_i|\right) < 6 \cdot \frac{\beta}{k},$$

wherein k is a positive integer, and
if the first condition or the second condition is satisfied, process the current row or column (501) of samples into the filtered row or column of samples by determining the filtered sample value $q_0'$ of the first sample of the current row or column of samples to the right or bottom of the vertical or horizontal edge (505) between the first and the second sample block (503a, 503b) on the basis of the following equation:

$q_0'=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+1 \cdot q_1+1 \cdot q_2+1 \cdot q_3+1 \cdot q_4+1 \cdot q_5+1 \cdot q_6+1 \cdot q_7+8)/16$; and/or by determining the filtered sample value $p_0'$ of the first sample of the current row or column (501) of samples to the left or top of the vertical or horizontal edge (505) between the first and the second sample block (503a, 503b) on the basis of the following equation:

$p_0'=(1 \cdot p_7+1 \cdot p_6+1 \cdot p_5+1 \cdot p_4+1 \cdot p_3+1 \cdot p_2+1 \cdot p_1+2 \cdot p_0+1 \cdot q_0+1 \cdot q_1+1 \cdot q_2+1 \cdot q_3+1 \cdot q_4+1 \cdot q_5+1 \cdot q_6+0 \cdot q_7+8)/16$.

8. The filter apparatus (120, 220) of claim 7, wherein the processing circuitry is configured to, if the first condition or the second condition is satisfied, process the current row or column (501) of samples into the filtered row or column of samples by determining a filtered sample value $q_1'$ of the second sample of the current row or column (501) of samples to the right or bottom of the vertical or horizontal edge (505) between the first and the second sample block (503a, 503b) on the basis of the following equation:

$q_1'=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+3 \cdot q_1+1 \cdot q_2+1 \cdot q_3+1 \cdot q_4+1 \cdot q_5+1 \cdot q_6+1 \cdot q_7+8)/16$; and/or by determining a filtered sample value $p_1'$ of the second sample of the current row or column (501) of samples to the left or top of the vertical or horizontal edge (505) between the first and the second sample block (503a, 503b) on the basis of the following equation:

$p_1'=(1 \cdot p_7+1 \cdot p_6+1 \cdot p_5+1 \cdot p_4+1 \cdot p_3+1 \cdot p_2+3 \cdot p_1+1 \cdot p_0+1 \cdot q_0+1 \cdot q_1+1 \cdot q_2+1 \cdot q_3+1 \cdot q_4+1 \cdot q_5+0 \cdot q_6+0 q_7+8)/16$.

9. The filter apparatus (120, 220) of claim 8, wherein the processing circuitry is configured to, if the first condition or the second condition is satisfied, process the current row or column (501) of samples into the filtered row or column of samples by determining a filtered sample value $q_2'$ of the third sample of the current row or column (501) of samples to the right or bottom of the vertically or horizontally extending edge (505) between the first and the second sample block (503a, 503b) on the basis of the following equation:

$q_2'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+1 \cdot q_1+3 \cdot q_2+1 \cdot q_3+1 \cdot q_4+1 \cdot q_5+1 \cdot q_6+2 \cdot q_7+8)/16$; and/or by determining a filtered sample value $p_2'$ of the third sample of the current row or column (501) of samples to the left or top of the vertically or horizontally extending edge between the first and the second sample block (503a, 503b) on the basis of the following equation:

$p_2'=(2 \cdot p_7+1 \cdot p_6+1 \cdot p_5+1 \cdot p_4+1 \cdot p_3+3 \cdot p_2+1 \cdot p_1+1 \cdot p_0+1 \cdot q_0+1 \cdot q_1+1 \cdot q_2+1 \cdot q_3+1 \cdot q_4+0 \cdot q_5+0 \cdot q_6+0 \cdot q_7+8)/16$.

10. The filter apparatus (120, 220) of claim 8, wherein the processing circuitry is configured to, if the first condition or the second condition is satisfied, process the current row or column (501) of samples into the filtered row or column of samples by determining a filtered sample value $q_3'$ of the fourth sample of the current row or column (501) of samples to the right or bottom of the vertically or horizontally extending edge (505) between the first and the second sample block (503a, 503b) on the basis of the following equation:

$p_3'=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+1 \cdot q_1+1 \cdot q_2+3 \cdot q_3+1 \cdot q_4+1 \cdot q_5+1 \cdot q_6+3 \cdot q_7+8)/16$; and/or by determining a filtered sample value $p_3'$ of the fourth sample of the current row or column (501) of samples to the left or top of the vertically or horizontally extending edge (505) between the first and the second sample block (503a, 503b) on the basis of the following equation:

$p_3'=(3 \cdot p_7+1 \cdot p_6+1 \cdot p_5+1 \cdot p_4+3 \cdot p_3+1 \cdot p_2+1 \cdot p_1+1 \cdot p_0+1 \cdot q_0+1 \cdot q_1+1 \cdot q_2+1 \cdot q_3+0 \cdot q_4+0 \cdot q_5+0 \cdot q_6+0 \cdot q_7+8)/16$.

11. The filter apparatus (120, 220) of claim 8, wherein the processing circuitry is configured to, if the first condition or the second condition is satisfied, process the current row or column (501) of samples into the filtered row or column of samples by determining a filtered sample value $q_4'$ of the fifth sample of the current row or column (501) of samples to the right or bottom of the vertically or horizontally extending edge (505) between the first and the second sample block (503a, 503b) on the basis of the following equation:

$q_4'=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+1 \cdot q_1+1 \cdot q_2+1 \cdot q_3+3 \cdot q_4+1 \cdot q_5+1 \cdot q_6+4 \cdot q_7+8)/16$; and/or by determining a filtered sample value $p_4'$ of the fifth sample of the current row or column (501) of samples to the left or top of the vertically or horizontally extending edge (505) between the first and the second sample block (503a, 503b) on the basis of the following equation:

$p_4'=(4 \cdot p_7+1 \cdot p_6+1 \cdot p_5+3 \cdot p_4+1 \cdot p_3+1 \cdot p_2+1 \cdot p_1+1 \cdot p_0+1 \cdot q_0+1 \cdot q_1+1 \cdot q_2+0 \cdot q_3+0 \cdot q_4+0 \cdot q_5+0 \cdot q_6+0 \cdot q_7+8)/16$.

12. The filter apparatus (120, 220) of claim 8, wherein the processing circuitry is configured to, if the first condition or the second condition is satisfied, process the current row or column (501) of samples into the filtered row or column of samples by determining a filtered sample value $q_5'$ of the sixth sample of the current row or column (501) of samples to the right or bottom of the vertically or horizontally extending edge (505) between the first and the second sample block (503a, 503b) on the basis of the following equation:

$$q_5'=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+\\ 1 \cdot q_1+1 \cdot q_2+1 \cdot q_3+1 \cdot q_4+3 \cdot q_5+1 \cdot q_6+5 \cdot q_7+8)/16; \text{ and/} \\ \text{or}$$

by determining a filtered sample value $p_5'$ of the sixth sample of the current row or column (501) of samples to the left or top of the vertically or horizontally extending edge (505) between the first and the second sample block (503a, 503b) on the basis of the following equation:

$$p_5'=(5 \cdot p_7+1 \cdot p_6+3 \cdot p_5+1 \cdot p_4+1 \cdot p_3+1 \cdot p_2+1 \cdot p_1+1 \cdot p_0+1 \cdot q_0+\\ 1 \cdot q_1+0 \cdot q_2+0 \cdot q_3+0 \cdot q_4+0 \cdot q_5+0 \cdot q_6+0 \cdot q_7+8)/16.$$

13. The filter apparatus (120, 220) of claim 8, wherein the processing circuitry is configured to, if the first condition or the second condition is satisfied, process the current row or column (501) of samples into the filtered row or column of samples by determining a filtered sample value $q_6'$ of the seventh sample of the current row or column (501) of samples to the right or bottom of the vertically or horizontally extending edge (505) between the first and the second sample block (503a, 503b) on the basis of the following equation:

$$q_6'=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+\\ 1 \cdot q_1+1 \cdot q_2+1 \cdot q_3+1 \cdot q_4+1 \cdot q_5+3 \cdot q_6+6 \cdot q_7+8)/16; \text{ and/} \\ \text{or}$$

by determining a filtered sample value $p_6'$ of the seventh sample of the current row or column (501) of samples to the left or top of the vertically or horizontally extending edge (505) between the first and the second sample block (503a, 503b) on the basis of the following equation:

$$p_6'=(6 \cdot p_7+3 \cdot p_6+1 \cdot p_5+1 \cdot p_4+1 \cdot p_3+1 \cdot p_2+1 \cdot p_1+1 \cdot p_0+1 \cdot q_0+\\ 0 \cdot q_1+0 \cdot q_2+0 \cdot q_3+0 \cdot q_4+0 \cdot q_5+0 \cdot q_6+0 \cdot q_7+8)/16.$$

14. The filter apparatus (120, 220) of claim 7, wherein the processing circuitry is configured to, if the first condition or the second condition is satisfied, process the current row or column (501) of samples into the filtered row or column of samples by determining a filtered sample value $q_1'$ of the second sample of the current row or column (501) of samples to the right or bottom of the vertically or horizontally extending edge (505) between the first and the second sample block (503a, 503b) on the basis of the following equation:

$$q_1'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+\\ 4 \cdot q_1+1 \cdot q_2+1 \cdot q_3+1 \cdot q_4+1 \cdot q_5+1 \cdot q_6+1 q_7+8)/16; \text{ and/} \\ \text{or}$$

by determining a filtered sample value $p_1'$ of the second sample of the current row or column (501) of samples to the left or top of the vertically or horizontally extending edge (505) between the first and the second sample block (503a, 503b) on the basis of the following equation:

$$p_1'=(1 \cdot p_7+1 \cdot p_6+1 \cdot p_5+1 \cdot p_4+1 \cdot p_3+1 \cdot p_2+4 \cdot p_1+1 \cdot p_0+1 \cdot q_0+\\ 1 \cdot q_1+1 \cdot q_2+1 \cdot q_3+1 \cdot q_4+1 \cdot q_5+0 \cdot q_6+0 \cdot q_7+8)/16.$$

15. The filter apparatus (120, 220) of claim 14, wherein the processing circuitry is configured to, if the first condition or the second condition is satisfied, process the current row or column (501) of samples into the filtered row or column of samples by determining a filtered sample value $q_2'$ of the third sample of the current row or column (501) of samples to the right or bottom of the vertically or horizontally extending edge (505) between the first and the second sample block (503a, 503b) on the basis of the following equation:

$$q_2'=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+\\ 1 \cdot q_1+4 \cdot q_2+1 \cdot q_3+1 \cdot q_4+1 \cdot q_5+1 \cdot q_6+2 \cdot q_7+8)/16; \text{ and/} \\ \text{or}$$

by determining a filtered sample value $p_2'$ of the third sample of the current row or column (501) of samples to the left or top of the vertically or horizontally extending edge (505) between the first and the second sample block (503a, 503b) on the basis of the following equation:

$$p_2'=(2 \cdot p_7+1 \cdot p_6+1 \cdot p_5+1 \cdot p_4+1 \cdot p_3+4 \cdot p_2+1 \cdot p_1+1 \cdot p_0+1 \cdot q_0+\\ 1 \cdot q_1+1 \cdot q_2+1 \cdot q_3+1 \cdot q_4+0 \cdot q_5+0 \cdot q_6+0 \cdot q_7+8)/16.$$

16. The filter apparatus (120, 220) of claim 14, wherein the processing circuitry is configured to, if the first condition or the second condition is satisfied, process the current row or column (501) of samples into the filtered row or column of samples by determining a filtered sample value $q_3'$ of the fourth sample of the current row or column (501) of samples to the right or bottom of the vertically or horizontally extending edge (505) between the first and the second sample block (503a, 503b) on the basis of the following equation:

$$q_3'=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+\\ 1 \cdot q_1+1 \cdot q_2+4 \cdot q_3+1 \cdot q_4+1 \cdot q_5+1 \cdot q_6+3 \cdot q_7+8)/16; \text{ and/} \\ \text{or}$$

by determining a filtered sample value $p_3'$ of the fourth sample of the current row or column (501) of samples to the left or top of the vertically or horizontally extending edge (505) between the first and the second sample block (503a, 503b) on the basis of the following equation:

$$p_3'=(3 \cdot p_7+1 \cdot p_6+1 \cdot p_5+1 \cdot p_4+4 \cdot p_3+1 \cdot p_2+1 \cdot p_1+1 \cdot p_0+1 \cdot q_0+\\ 1 \cdot q_1+1 \cdot q_2+1 \cdot q_3+0 \cdot q_4+0 \cdot q_5+0 \cdot q_6+0 \cdot q_7+8)/16.$$

17. The filter apparatus (120, 220) of claim 14, wherein the processing circuitry is configured to, if the first condition or the second condition is satisfied, process the current row or column (501) of samples into the filtered row or column of samples by determining a filtered sample value $q_4'$ of the fifth sample of the current row or column (501) of samples to the right or bottom of the vertically or horizontally extending edge (505) between the first and the second sample block (503a, 503b) on the basis of the following equation:

$$q_4'=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+\\ 1 \cdot q_1+1 \cdot q_2+1 \cdot q_3+4 \cdot q_4+1 \cdot q_5+1 \cdot q_6+4 \cdot q_7+8)/16; \text{ and/} \\ \text{or}$$

by determining a filtered sample value $p_4'$ of the fifth sample of the current row or column (501) of samples to the left or top of the vertically or horizontally extending edge (505) between the first and the second sample block (503a, 503b) on the basis of the following equation:

$$p_4'=(4 \cdot p_7+1 \cdot p_6+1 \cdot p_5+4 \cdot p_4+1 \cdot p_3+1 \cdot p_2+1 \cdot p_1+1 \cdot p_0+1 \cdot q_0+\\ 1 \cdot q_1+1 \cdot q_2+0 \cdot q_3+0 \cdot q_4+0 \cdot q_5+0 \cdot q_6+0 \cdot q_7+8)/16.$$

18. The filter apparatus (120, 220) of claim 14, wherein the processing circuitry is configured to, if the first condition or the second condition is satisfied, process the current row or column (501) of samples into the filtered row or column of samples by determining a filtered sample value $q_5'$ of the sixth sample of the current row or column (501) of samples to the right or bottom of the vertically or horizontally extending edge (505) between the first and the second sample block (503a, 503b) on the basis of the following equation:

$$q_5'=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+\\ 1 \cdot q_1+1 \cdot q_2+1 \cdot q_3+1 \cdot q_4+4 \cdot q_5+1 \cdot q_6+5 \cdot q_7+8)/16; \text{ and/} \\ \text{or}$$

by determining a filtered sample value $p_5'$ of the sixth sample of the current row or column (501) of samples to the left or top of the vertically or horizontally extending edge (505) between the first and the second sample block (503a, 503b) on the basis of the following equation:

$p_5' = (5 \cdot p_7 + 1 \cdot p_6 + 4 \cdot p_5 + 1 \cdot p_4 + 1 \cdot p_3 + 1 \cdot p_2 + 1 \cdot p_1 + 1 \cdot p_0 + 1 \cdot q_0 + 1 \cdot q_1 + 0 \cdot q_2 + 0 \cdot q_3 + 0 \cdot q_4 + 0 \cdot q_5 + 0 \cdot q_6 + 0 \cdot q_7 + 8)/16.$

19. The filter apparatus (120, 220) of claim 14, wherein the processing circuitry is configured to, if the first condition or the second condition is satisfied, process the current row or column (501) of samples into the filtered row or column of samples by determining a filtered sample value $q_6'$ of the seventh sample of the current row or column (501) of samples to the right or bottom of the vertically or horizontally extending edge (505) between the first and the second sample block (503a, 503b) on the basis of the following equation:

$q_6' = (0 \cdot p_7 + 0 \cdot p_6 + 0 \cdot p_5 + 0 \cdot p_4 + 0 \cdot p_3 + 0 \cdot p_2 + 0 \cdot p_1 + 1 \cdot p_0 + 1 \cdot q_0 + 1 \cdot q_1 + 1 \cdot q_2 + 1 \cdot q_3 + 1 \cdot q_4 + 1 \cdot q_5 + 4 \cdot q_6 + 6 \cdot q_7 + 8)/16;$ and/or by determining a filtered sample value $p_6'$ of the seventh sample of the current row or column (501) of samples to the left or top of the vertically or horizontally extending edge (505) between the first and the second sample block (503a, 503b) on the basis of the following equation:

$p_6' = (6 \cdot p_7 + 4 \cdot p_6 + 1 \cdot p_5 + 1 \cdot p_4 + 1 \cdot p_3 + 1 \cdot p_2 + 1 \cdot p_1 + 1 \cdot p_0 + 1 \cdot q_0 + 0 \cdot q_1 + 0 \cdot q_2 + 0 \cdot q_3 + 0 \cdot q_4 + 0 \cdot q_5 + 0 \cdot q_6 + 0 \cdot q_7 + 8)/16.$

20. The filter apparatus (120, 220) of claim 7, wherein the processing circuitry is configured to, if the first condition or the second condition is satisfied, process the current row or column (501) of samples into the filtered row or column of samples by determining a filtered sample value $q_7'$ of the eighth sample of the current row or column (501) of samples to the right or bottom of the vertically or horizontally extending edge (505) between the first and the second sample block (503a, 503b) on the basis of the following equation:

$q_7' = q_7;$ and/or by determining a filtered sample value $p_7'$ of the eighth sample of the current row or column (501) of samples to the left or top of the vertically or horizontally extending edge (505) between the first and the second sample block (503a, 503b) on the basis of the following equation:

$p_7' = p_7.$

21. A method for processing a current row or column (501) of samples into a filtered row or column of samples, wherein the current row or column (501) of samples comprises samples from a first sample block (503a) and a horizontally or vertically neighboring second sample block (503b) of a reconstructed picture of a video stream and wherein each sample of the current row or column (501) of samples has a sample value $p_{N-1}$–$p_0$, $q_0$–$q_{N-1}$ with N being an even integer larger than 2, wherein the method comprises:

determining (i) whether a first condition defined by the following equation is satisfied:

$((|p_{N-1} - 2 \cdot p_{N/2} + p_1| + |q_{N-1} - 2 \cdot q_{N/2} + q_1|) \ll 1) < \frac{\beta}{k}$ wherein $\beta$ denotes a threshold parameter, k is a positive integer and the symbol "$\ll$" denotes the left shift operation, or (ii) whether a second condition defined by the following equation is satisfied:

$\left(\left(\sum_{i=1}^{N-2} |SDpi + SDqi|\right) \ll 1\right) < (N-2) \cdot \frac{\beta}{k},$ wherein $SDp_i = |p_{i-1} - 2 \cdot p_i + p_{i+1}|$, $SDq_i = |q_{i-1} - 2 \cdot q_i + q_{i+1}|$ for $i \in [1, 2, \ldots, N-2]$ and $\beta$ denotes a threshold parameter; and if the first condition or the second condition is satisfied, processing the current row or column (501) of samples into the filtered row or column of samples by determining a filtered sample value $q_0'$ of the first sample of the current row or column of samples to the right or bottom of a vertical or horizontal edge (505) between the first and the second sample block (503a, 503b) by applying a (2N−1) tap filter having 2N−1 filter coefficients to the sample values of the current row or column (501) of samples, wherein the filter coefficient for the sample value $q_0$ of the first sample of the current row or column of samples to the right or bottom of the vertical or horizontal edge (505) is equal to 2, wherein the filter coefficient for the sample value $p_{N-1}$ of the farthest sample of the current row or column of samples to the left or top of the vertical or horizontal edge (505) is equal to 0, and the filter coefficients for the other sample values are equal to 1; and/or by determining a filtered sample value $p_0'$ of the first sample of the current row or column of samples to the left or top of a vertical or horizontal edge (505) between the first and the second sample block (503a, 503b) by applying a (2N−1) tap filter having 2N−1 filter coefficients to the sample values of the current row or column (501) of samples, wherein the filter coefficient for the sample value $p_0$ of the first sample of the current row or column of samples to the left or top of the vertical or horizontal edge (505) is equal to 2, wherein the filter coefficient for the sample value $q_{N-1}$ of the farthest sample of the current row or column of samples to the right or bottom of the vertical or horizontal edge (505) is equal to 0, and the filter coefficients for the other sample values are equal to 1.

22. A non-transitory computer-readable media storing computer instructions that when executed by one or more processors, cause the one or more processors to perform a method for processing a current row or column (501) of samples into a filtered row or column of samples, wherein the current row or column (501) of samples comprises samples from a first sample block (503a) and a horizontally or vertically neighboring second sample block (503b) of a reconstructed picture of a video stream and wherein each sample of the current row or column (501) of samples has a sample value $p_{N-1}$–$p_0$, $q_0$–$q_{N-1}$ with N being an even integer larger than 2, wherein the method comprises:

determining (i) whether a first condition defined by the following equation is satisfied:

$((|p_{N-1} - 2 \cdot p_{N/2} + p_1| + |q_{N-1} - 2 \cdot q_{N/2} + q_1|) \ll 1) < \frac{\beta}{k}$ wherein $\beta$ denotes a threshold parameter, k is a positive integer and the symbol "$\ll$" denotes the left shift operation, or (ii) whether a second condition defined by the following equation is satisfied:

$$\left(\left(\sum_{i=1}^{N-2}|SDpi+SDqi|\right)\ll 1\right)<(N-2)\cdot\frac{\beta}{k},$$

wherein $SDp_i=|p_{i-1}-2\cdot p_i+p_{i+1}|$, $SDq_i=|q_{i-1}-2\cdot q_i+q_{i+1}|$ for $i\in[1, 2, \ldots, N-2]$ and $\beta$ denotes a threshold parameter; and if the first condition or the second condition is satisfied, processing the current row or column (501) of samples into the filtered row or column of samples by determining a filtered sample value $q_0'$ of the first sample of the current row or column of samples to the right or bottom of a vertical or horizontal edge (505) between the first and the second sample block (503a, 503b) by applying a (2N−1) tap filter having 2N−1 filter coefficients to the sample values of the current row or column (501) of samples, wherein the filter coefficient for the sample value $q_0$ of the first sample of the current row or column of samples to the right or bottom of the vertical or horizontal edge (505) is equal to 2, wherein the filter coefficient for the sample value $p_{N-1}$ of the farthest sample of the current row or column of samples to the left or top of the vertical or horizontal edge (505) is equal to 0, and the filter coefficients for the other sample values are equal to 1; and/or by determining a filtered sample value $p_0'$ of the first sample of the current row or column of samples to the left or top of a vertical or horizontal edge (505) between the first and the second sample block (503a, 503b) by applying a (2N−1) tap filter having 2N−1 filter coefficients to the sample values of the current row or column (501) of samples, wherein the filter coefficient for the sample value $p_0$ of the first sample of the current row or column of samples to the left or top of the vertical or horizontal edge (505) is equal to 2, wherein the filter coefficient for the sample value $q_{N-1}$ of the farthest sample of the current row or column of samples to the right or bottom of the vertical or horizontal edge (505) is equal to 0, and the filter coefficients for the other sample values are equal to 1.

* * * * *